(12) United States Patent
Prabhune et al.

(10) Patent No.: US 7,787,245 B2
(45) Date of Patent: Aug. 31, 2010

(54) ELECTRONIC APPARATUS AND PROGRAM

(75) Inventors: Uday A. Prabhune, Sunnyvale, CA (US); Asao Shimazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1350 days.

(21) Appl. No.: 11/182,610

(22) Filed: Jul. 15, 2005

(65) Prior Publication Data

US 2006/0045495 A1   Mar. 2, 2006

Related U.S. Application Data

(60) Provisional application No. 60/616,050, filed on Oct. 4, 2004.

(30) Foreign Application Priority Data

Aug. 27, 2004   (JP)   ............................ 2004-249258

(51) Int. Cl.
    *G06F 1/16*   (2006.01)
(52) U.S. Cl. ............................ 361/679.37; 361/679.27; 361/679.32; 369/30.06; 369/30.32; 720/601; 720/610
(58) Field of Classification Search ......... 361/679–686; 312/223.1, 223.2; 710/303, 304
    See application file for complete search history.

(56) References Cited

U.S. PATENT DOCUMENTS

| | | | | |
|---|---|---|---|---|
| 4,903,222 A | * | 2/1990 | Carter et al. | 361/680 |
| 5,311,455 A | * | 5/1994 | Ho | 361/685 |
| 5,764,478 A | * | 6/1998 | Ohgami et al. | 361/684 |
| 5,889,964 A | * | 3/1999 | Cho et al. | 710/304 |
| 5,933,322 A | * | 8/1999 | Ruch et al. | 361/686 |
| 5,987,545 A | * | 11/1999 | Oh | 710/100 |
| 6,008,992 A | * | 12/1999 | Kawakami | 361/726 |
| 6,111,837 A | * | 8/2000 | Watanabe et al. | 720/601 |

(Continued)

FOREIGN PATENT DOCUMENTS

EP   0 823 686   2/2003

(Continued)

OTHER PUBLICATIONS

German Patent Office, "Translation of the Official Communication of EP 0 823 686 B1 and EP 0 718 747, dated Jan. 31, 2008," 3 pages, Received Apr. 22, 2008.

(Continued)

*Primary Examiner*—Jayprakash N Gandhi
*Assistant Examiner*—Anthony Q Edwards
(74) *Attorney, Agent, or Firm*—Baker Botts L.L.P.

(57) ABSTRACT

An electronic apparatus 10, such as a computer, includes a first unit 20 having a keyboard 21 and a second unit 30 coupled to the first unit 20 having a display screen 31 through a two-axis coupling section 40 to be opened, closed, and rotated relative to the first unit 20. The computer may be used either as a notebook PC or a tablet PC, and includes an optical disk drive 26 for accessing an optical disk. The present invention protects the optical disk and the optical disk drive against damage when the computer is used in the tablet PC mode. Depending on the status of the second unit 30 relative to the first unit 20, the apparatus enables or disables use of optical disk drive 26, including the drive ejection button.

15 Claims, 33 Drawing Sheets

U.S. PATENT DOCUMENTS

| | | | |
|---|---|---|---|
| 6,275,376 B1* | 8/2001 | Moon | 361/679.06 |
| 6,327,151 B1* | 12/2001 | Chen et al. | 361/726 |
| 6,407,915 B1* | 6/2002 | Derocher et al. | 361/679.41 |
| 6,510,051 B2* | 1/2003 | Kim | 361/686 |
| 6,522,533 B1* | 2/2003 | Ikeuchi et al. | 361/686 |
| 6,606,240 B2* | 8/2003 | Huang | 361/685 |
| 6,711,004 B2* | 3/2004 | Yen et al. | 361/679.06 |
| 6,813,146 B2* | 11/2004 | Haraguchi et al. | 361/679.55 |
| 6,995,813 B2* | 2/2006 | Shin | 349/58 |
| 7,054,154 B2* | 5/2006 | Mullen et al. | 361/686 |
| 7,133,280 B2* | 11/2006 | Love | 361/681 |
| 7,148,877 B2* | 12/2006 | Chang et al. | 345/156 |
| 7,242,385 B2* | 7/2007 | Kojo | 345/156 |
| 7,424,631 B2 | 9/2008 | Ishidera et al. | 713/320 |
| 7,433,181 B2* | 10/2008 | Homer et al. | 361/683 |
| 7,506,152 B2* | 3/2009 | Park et al. | 713/100 |
| 7,684,288 B2* | 3/2010 | Kaneko et al. | 369/30.32 |
| 2002/0018426 A1* | 2/2002 | Minase | 369/75.2 |
| 2002/0167882 A1* | 11/2002 | Kunz | 369/77.2 |
| 2003/0043720 A1* | 3/2003 | Fujisawa | 369/75.2 |
| 2004/0030943 A1 | 2/2004 | Ishidera et al. | 713/320 |
| 2004/0052062 A1* | 3/2004 | DeLuga | 361/801 |
| 2004/0090742 A1* | 5/2004 | Son et al. | 361/686 |
| 2004/0227724 A1* | 11/2004 | Chang et al. | 345/156 |
| 2004/0228081 A1* | 11/2004 | Lee | 361/683 |
| 2004/0261088 A1* | 12/2004 | Hsu et al. | 720/601 |
| 2005/0010708 A1* | 1/2005 | Haley et al. | 710/303 |
| 2005/0057894 A1* | 3/2005 | Kim et al. | 361/683 |
| 2005/0128676 A1* | 6/2005 | Homer et al. | 361/300 |
| 2005/0243504 A1* | 11/2005 | Wong et al. | 361/683 |
| 2007/0061564 A1* | 3/2007 | Park et al. | 713/100 |
| 2007/0103442 A1* | 5/2007 | Pappas | 345/168 |
| 2008/0301554 A1 | 12/2008 | Ishidera et al. | 715/700 |

FOREIGN PATENT DOCUMENTS

| | | |
|---|---|---|
| EP | 0 718 747 B1 | 5/2003 |
| JP | 07-037320 A | 2/1995 |
| JP | 09-091933 A | 4/1997 |
| JP | 11-312876 A | 11/1999 |
| JP | 2000339071 | 12/2000 |
| JP | 2001-282620 A | 10/2001 |
| WO | 02/065263 | 8/2002 |

OTHER PUBLICATIONS

German Patent Office, "First Official Office Communication—Office Action of EP 0 823 686 B1 and EP 0 718 747, dated Jan. 31, 2008," Untranslated, 4 pages, Received Apr. 22, 2008.

* cited by examiner

CD Lock Application

ELECTRONIC APPARATUS AND PROGRAM

CROSS-REFERENCE TO RELATED APPLICATIONS

This application claims priority to Japanese Patent Application No. 2004-249258 filed on Aug. 27, 2004 and U.S. Provisional Patent Application Ser. No. 60/616,050 filed on Oct. 4, 2004, the entire disclosures of which are incorporated by reference.

BACKGROUND OF THE INVENTION

1. Field of the Invention

The present invention relates to a programmable electronic apparatus, such as a personal computer, having a first unit and a second unit coupled to be opened and closed through a coupling section; and more specifically to a convertible notebook computer wherein the first unit is provided with a keyboard, the second unit comprises a display usable as a tablet computer, and the coupling section allows the second unit to be moved so that either side of the second unit faces up when the notebook computer is closed.

2. Background

Typically, notebook or laptop computers have a first unit comprising a keyboard that is coupled by hinges to a second unit having a display screen, such that the second unit can be opened and closed to the first unit. When the apparatus is used, the second unit is opened, and when it is not used, the display screen is closed to lie on the keyboard. Hereinafter, this type of apparatus will be referred to as a notebook PC. Notebook PCs typically have an internal optical disk drive ("ODD"), such as a CD, CDR, DVD or combination ODD drive which handles multiple media formats.

Another type of portable compute comprises a display screen, wherein the display screen is configured to recognize a stylus or pen-like device that is placed close to or in contact with the screen to enable user input. This type of apparatus is known as a tablet personal computer (hereinafter referred to as a tablet PC). Tablet PCs are particularly useful in situations where greater portability is needed because they can be carried and used in any orientation while the user is walking and standing.

Recently, convertible tablet/notebook computers have become available, wherein the keyboard section and the display section are coupled through a two-axis coupling device which allows the display unit to be opened, closed, and freely moved thereon. This configuration allows the computer can be used either as a traditional notebook PC, with the display screen projecting upward from the keyboard unit, or as a tablet PC with the display section resting face up on keyboard. This type of computer will be referred to as a convertible PC.

There is a need for incorporating an optical disk drive into convertible PCs. However, available optical disk drives are designed to have the optical disk inserted therein horizontally or vertically. In addition, the axis of rotation should not be rapidly changed while the media is spinning in the ODD. If the rotation axis is not kept horizontal or vertical, or the orientation of the drive is changed while the drive is in use, the drive may not work well, the inserted optical disk may be damaged, or the optical disk drive itself may be damaged. When a convertible PC is used as a notebook PC, it is typically placed on a desk or other flat, horizontal surface, so that the optical disk drive can operate without mishap. However, when the convertible PC is used as a tablet PC, it is normally carried by one hand and operated by a pen held by the other hand. Therefore, the orientation of the computer is not stable, and there is little likelihood that the rotation axis of the optical disk drive will be kept either vertical or horizontal.

SUMMARY OF THE INVENTION

The present invention has been made in view of the above circumstances and provides a dual-use electronic apparatus provided with a drive for accessing a removable storage medium such as an optical disk. In one aspect the invention protects the drive against damage, using a control program executed by the electronic apparatus.

In one embodiment, the electronic apparatus according to the present invention is an electronic apparatus having a first unit and a second unit coupled to the first unit through a coupling section which holds the second unit to be opened and closed relative to the first unit and includes a drive for accessing a removable storage medium and an operation prohibition section which sets or releases an operation prohibition mode for prohibiting the operation on a medium drive and/or the drive of a storage medium by the medium drive depending on the status of the second unit relative to the first unit. The electronic apparatus of the present invention includes the operation prohibition section and prohibits the drive of a storage medium by a medium drive depending on the status of the second unit relative to the first unit. Therefore, when the apparatus is placed on the desk and kept stable, the drive of a storage medium is permitted. However, when there is the possibility that the apparatus becomes unstable, the drive of the storage medium is prohibited, thereby protecting the storage medium and the medium drive against damage. By prohibiting access to a storage medium inserted into the drive is prohibited, the accidental loss or damage to storage medium and the drive can be prevented.

In another aspect of the present invention, the first unit can be removably attached from third unit, such as a port replicator, such when it is attached to the third unit there is not a risk to the drive, and operation of the drive is enabled. Thus, the present invention sets or releases operation prohibition mode depending on the attached/removed status of the first unit relative to the third unit.

In a further aspect of the present invention, when the operation prohibition section sets the operation prohibition mode, the status is displayed on the display screen providing notification that the drive cannot be used.

According to yet another aspect of the present invention, the operation prohibition section can be overridden be the user so that the drive can be accessed.

According to another aspect of the present invention the electronic apparatus having two units has an expansion device in the first unit which moves to a storage status and an extended status relative to the first unit; and an operation prohibition section which sets or releases the operation prohibition mode for prohibiting the movement of the unit of the expansion device from the storage status to the extended status depending on the status of the second unit relative to the first unit.

In another aspect the present invention an electronic apparatus having a first unit and a second unit coupled to the first unit through a coupling section which holds the second unit to be opened and closed relative to the first unit and a drive which accesses a removable storage medium comprises the method of detecting the status of the coupling section relative to the first unit; and setting or releasing the operation prohibition mode for prohibiting the operation on the medium drive and/or the drive of the storage medium by the medium drive depending on the status.

In another embodiment an electronic apparatus that includes an expansion device having a unit which and moves between a storage status and an extended status relative to the first unit, comprises a method of detecting the status of the coupling section relative to the first unit; and setting or releasing an operation prohibition mode for prohibiting the movement of the unit of the expansion device from a storage status to an extended status depending on the status.

DETAILED DESCRIPTION OF THE INVENTION

An embodiment of an electronic apparatus according to the present invention is explained below.

Appearance

Figure 1:
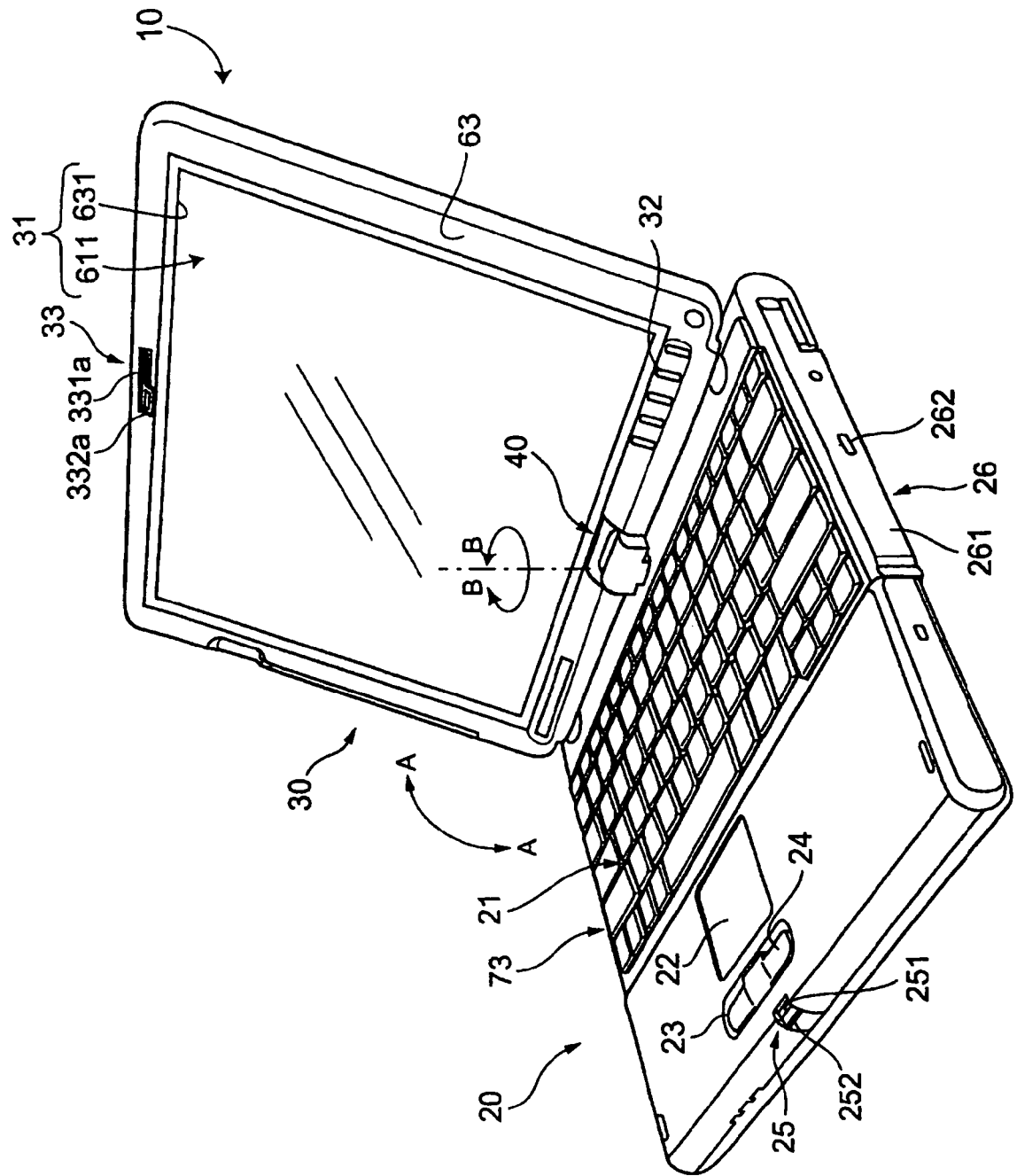
FIG. 1 is a perspective illustration of the appearance of a convertible PC in accordance with the present invention.

FIG. 1 is a perspective illustration of the appearance of computer of the present invention. The embodiment of the inventive electronic described herein is a convertible PC which may be operated either as a notebook PC or as a tablet PC. However, the present invention is not intended to be limited to the particular embodiments that are described, and has application to other types of electronic apparatus.

An electronic apparatus 10 includes a first unit 20, and a second unit 30. Electronic apparatus 10 may sometimes be referred to as a computer or as a convertible PC. First unit 20 and second unit 30 are coupled through a two-axis coupling section 40 such that second unit 30 can be opened and closed in the direction of the arrow A-A to first unit 20, and can be rotated in the direction of the arrow B-B (on the vertical rotation axis). In FIG. 1, second unit 30, comprising a display screen, is open relative to the first unit 20, comprising a keyboard. For convenience, the first unit will sometimes be referred to as the base or keyboard unit, and the second unit will sometimes be referred to as the display or display unit.

Base unit 20 includes on an upper cover 73 a keyboard 21, a touch pad 22, a left click button 23, a right click button 24, and an engagement mechanism 25 for securely engaging the second unit 30 in a closed position. The engagement mechanism 25 is provided with an engagement hole 251 for the fixture of the second unit 30, and an engagement release button 252 for releasing the engagement of the fixture in the engagement hole. The details of the engagement mechanism 25 are described later. On a side of base unit 20, an open/close cover 261 of an optical disk drive 26 for accessing an optical disk such as a CD, a DVD, etc. The open/close cover 261 is provided with an eject button 262 for opening the open/close cover 261 so that disks can be inserted or removed from optical disk drive 26.

Figure 2:
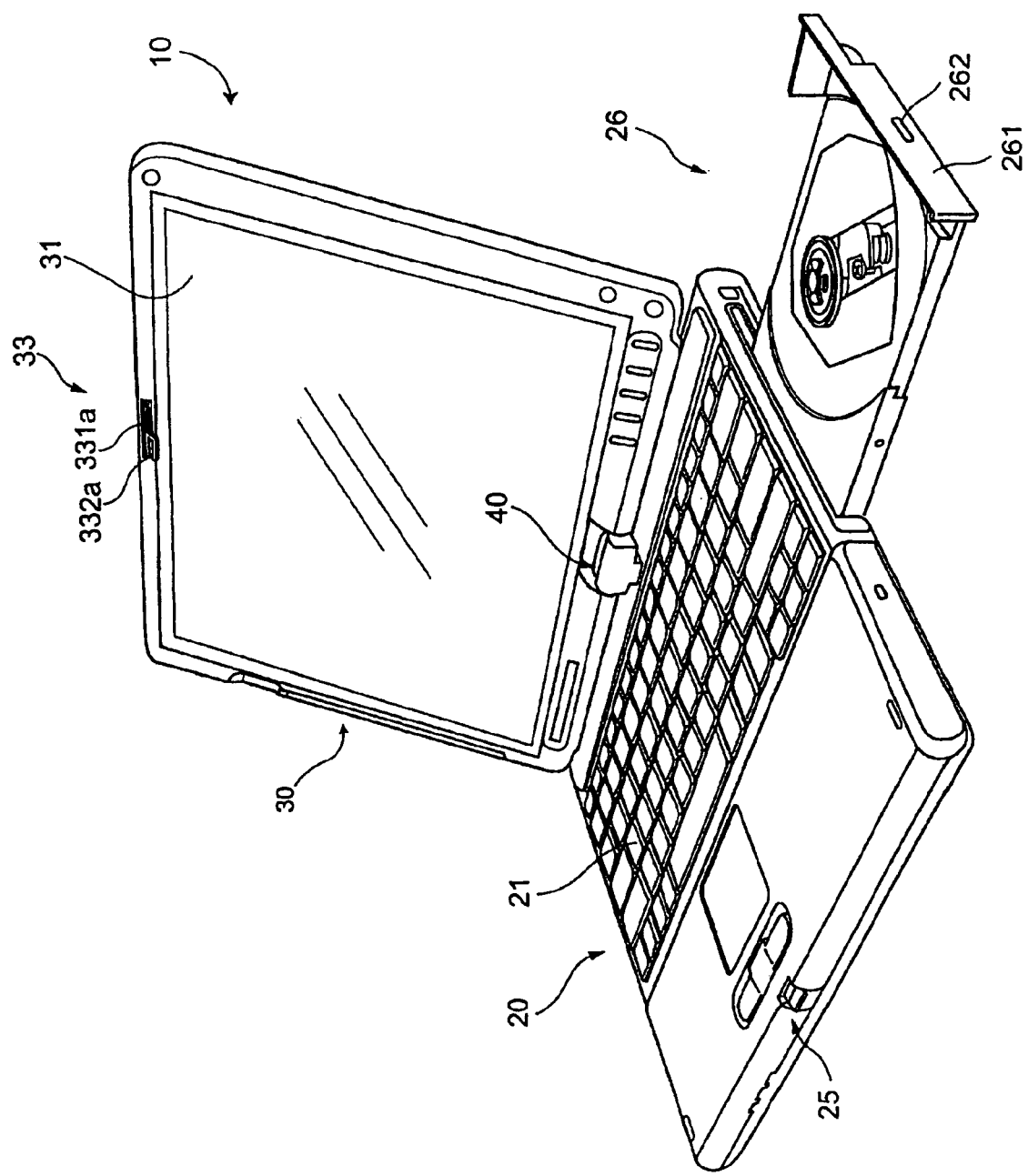
FIG. 2 is a perspective illustration of the appearance of the convertible PC shown in FIG. 1 in which the optical disk drive 26 is opened.

When eject button 262 is pressed the tray of the optical disk drive 26 is projected, unless the button has been disabled as described herein. FIG. 2 is a perspective illustration of computer of FIG. 1 showing optical disk drive 26 in the open position for the insertion or removal of optical media.

Referring again to FIG. 1, second unit 30 of computer 10 includes a front cover 63 having a display window 631. This side of second unit 30 will be referred to as the "front" side. In display window 631, a display screen 611 of a built-in display panel 61 (refer, e.g., to FIGS. 19 to 21) is shown. The combination of the display screen 611 and the display window 631 is sometimes referred to as display screen 31. In the preferred embodiment, second unit 30 is provided with a plurality of buttons 32 adjacent to display screen 31. Above display screen 31 an attachment unit 33 is provided with a fixture for engaging engagement mechanism 25 of base unit 20 when second unit 30 is closed. As described in detail later, attachment unit 33 comprises two fixtures. In FIG. 1, one fixture 332a of the two fixtures is projected from an aperture 331a on the front of the display unit.

Figure 3:
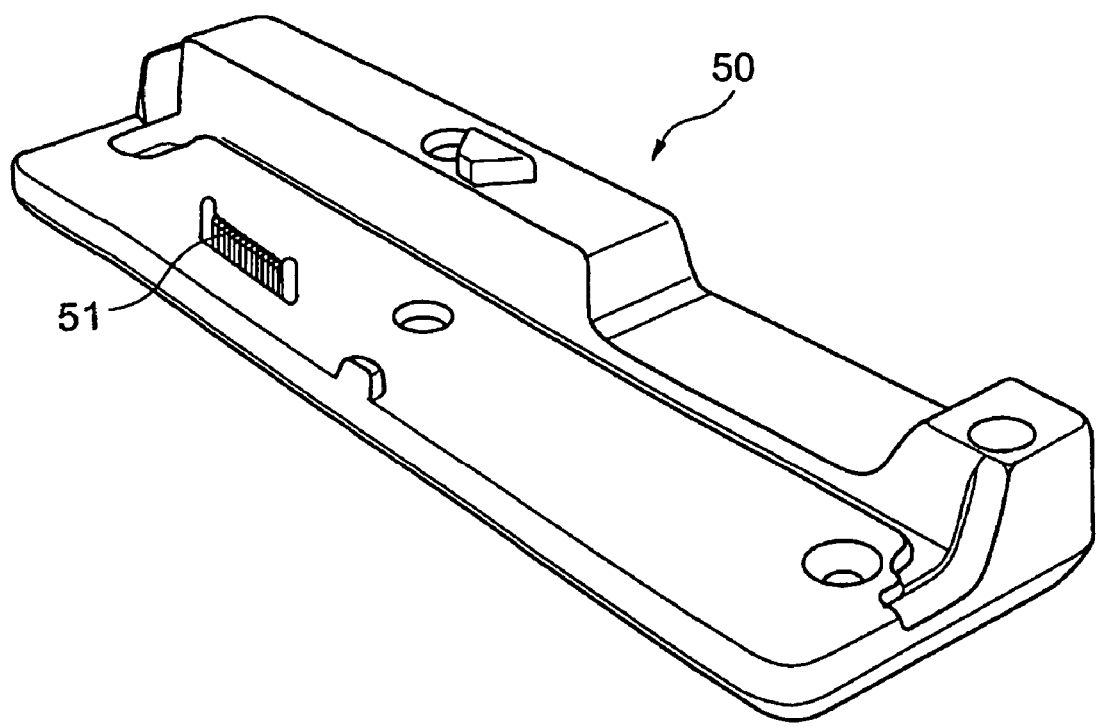
FIG. 3 is a perspective illustration of the appearance of the port replicator for use with the convertible PC shown in FIGS. 1 and 2.
Figure 4:
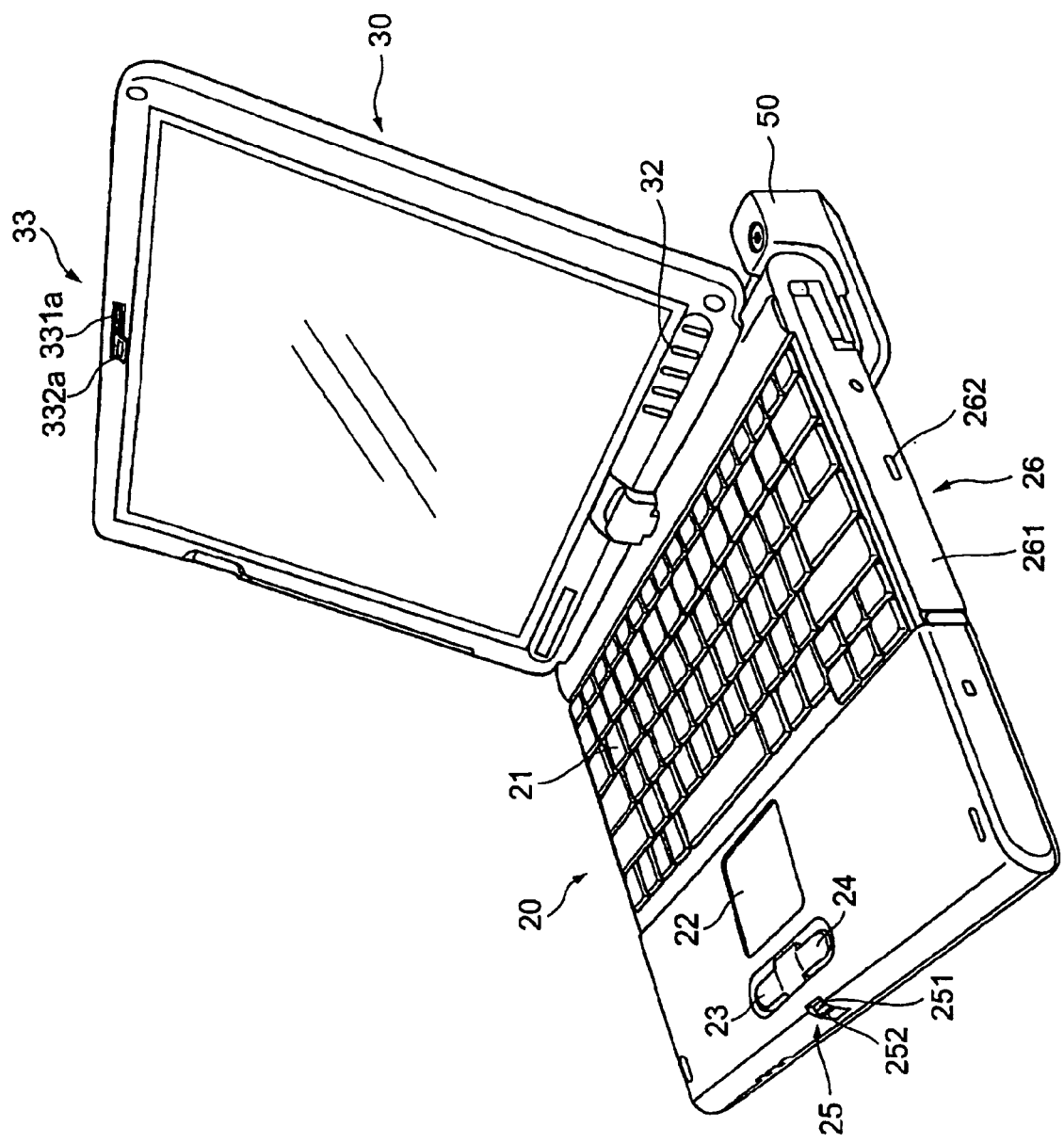
FIG. 4 is a perspective illustration showing the notebook mode of the convertible PC of the present invention in the open position, coupled to the port replicator shown in FIG. 3.

FIG. 3 is a perspective illustration of a port replicator 50 for use with the computer 10 shown in FIGS. 1 and 2; and FIG. 4 shows base unit 20 of computer 10 coupled to port replicator 50, with display unit 30 in the open position.

As shown in FIG. 3, port replicator 50 is provided with a connector 51 for electrically coupling to base unit 20, and has a variety of I/O terminals on the back (not shown), of the type normally used with PCs. Thus, in FIG. 4 connector 51 of the port replicator 50 is coupled to a connector (not shown) provided in bottom of base unit 20, thereby providing signal and power connection between first unit 20 and port replicator 50. Although various I/O terminals are provided in computer 10, the port replicator 50 has the function of extending the number and type of I/O terminals available to the user. One or more peripheral devices or communication lines (i.e., network cables, telephone lines, etc.) may be connected to the I/O terminals on port replicator 50, thereby adding to the functionality of computer 10. When electronic apparatus 10 is used as a notebook PC (referred to as the notebook PC mode), the base unit 20 is simply placed on the port replicator 50 as shown in FIG. 4 to provide the desired added functionality. However, when it is not necessary to use the peripheral equipment and connections provided by port replicator 50, computer 10 may be removed from the port replicator 50 and can be used either in the notebook PC mode or the tablet PC mode.

Figure 5:
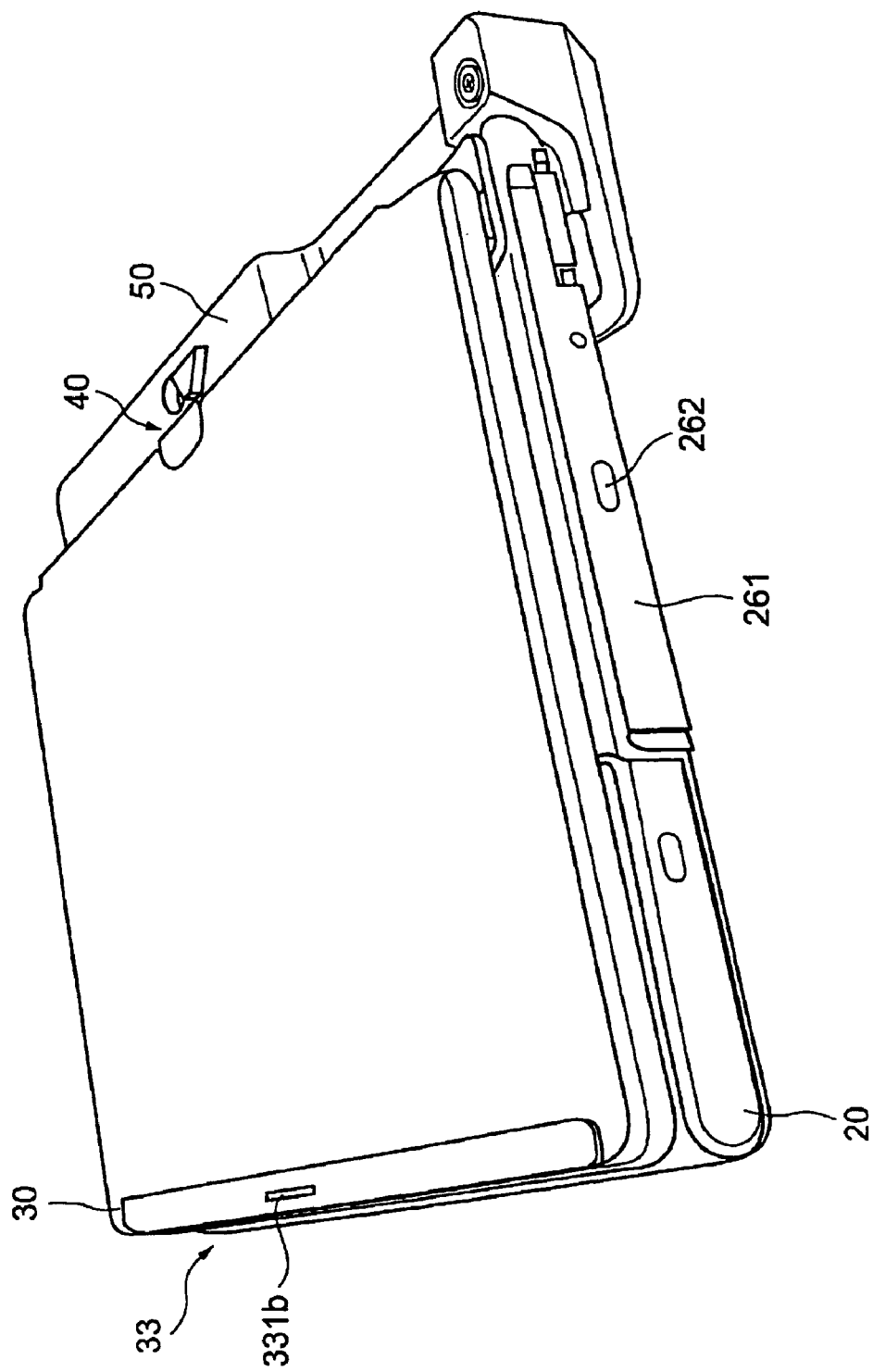
FIG. 5 is a perspective illustration showing the notebook mode of the convertible PC in the closed position, coupled to the port replicator.

FIG. 5 shows computer 10 placed on the port replicator with the display unit 30 in the closed position, securely attached to base unit 20. Display unit 30 is laid on base unit 20 with display screen 31 (refer to FIG. 1) facing unit 20. In this position, referred to as the first closed position, display screen 31 is hidden from view and is protected from being damaged.

As shown in FIG. 5, the attachment unit 33 for engagement in base unit 20 has an aperture 331b on the back of the second unit 30. The details of the attachment unit 33 are described later.

Figure 6:
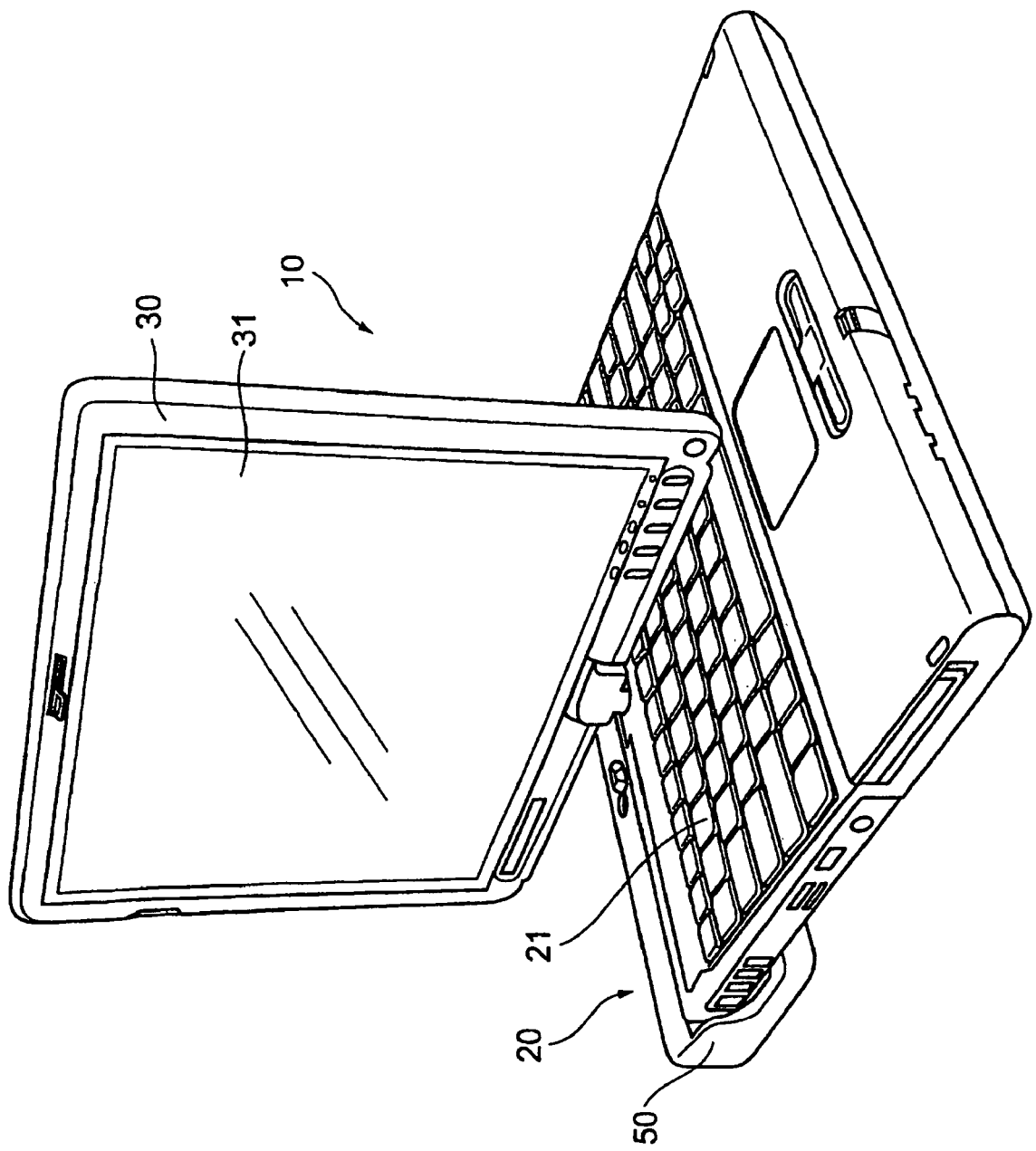
FIG. 6 is a perspective illustration showing the display unit rotated by 90° relative to the normal open position.

FIG. 6 shows computer 10 with display unit 30 rotated by 90° relative to the front side of base unit 20. Display unit 30 can be further rotated such that display screen 31 faces away from the keyboard 21.

Figure 7:
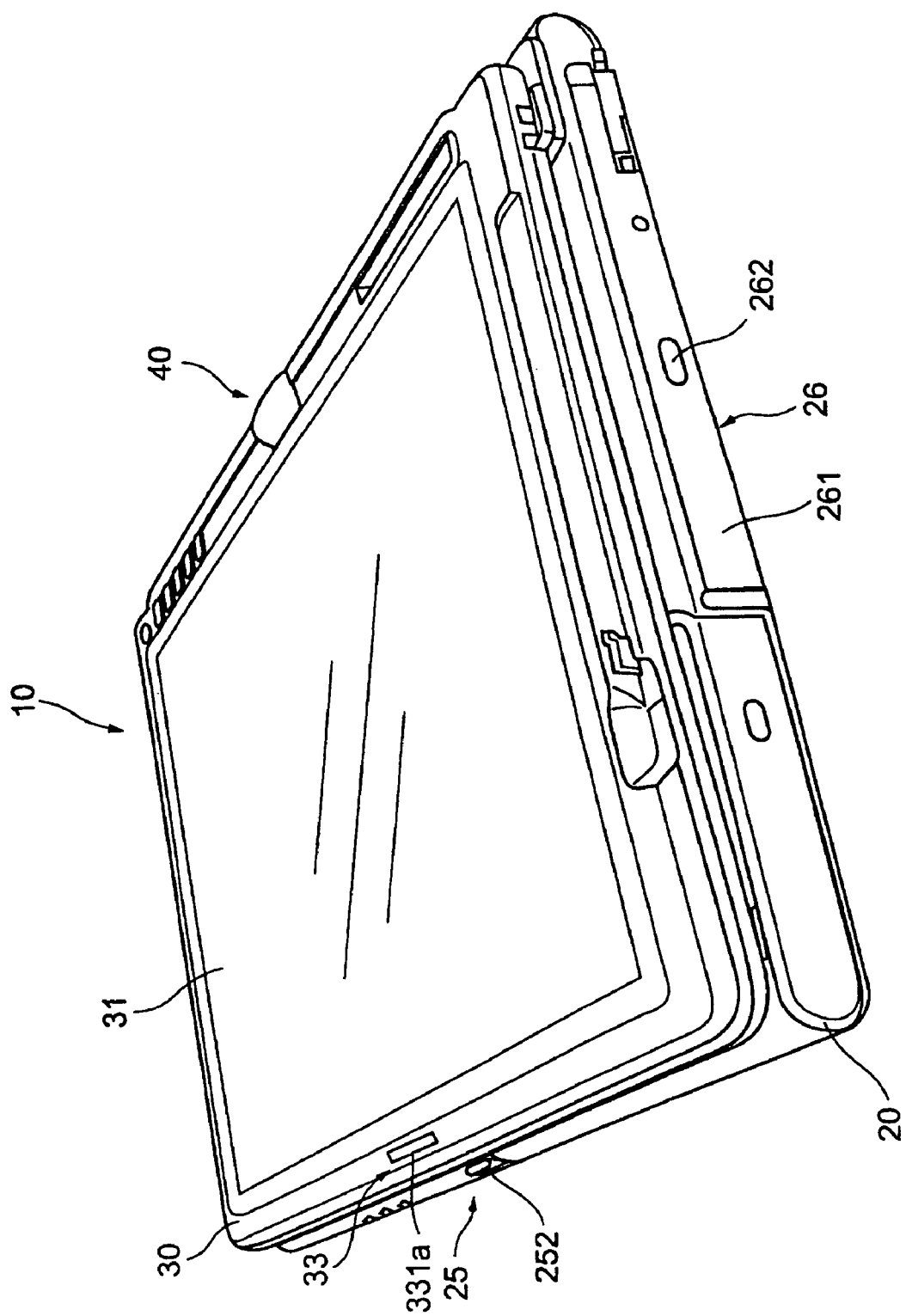
FIG. 7 is a perspective illustration of the convertible PC of the present invention in the tablet mode with the display screen lying on the keyboard unit facing upward.

Display unit 30 can be rotated into a position such that display screen 31 faces upward when the two units are closed as shown in FIG. 7. In this position, the display is opposite keyboard 21 and is visible to the user. This position is referred to as the second closed status. In the second closed status, computer 10 may be used as a tablet PC, and this is referred to as the tablet mode. Normally, in the tablet mode, computer 10 removed from the port replicator 50.

Display screen 31 has a pen input function for detecting the contact of a pen or the close position of a pen. Normally, when computer 10 is used in the tablet mode it is carried in one arm, and the hand of the other arm holds a pen (not shown in the drawings), which is used to provide input directly to the display screen. Normally, in the tablet mode the image on the display screen 31 is rotated by 90° relative to the display provided in the notebook PC mode shown, as shown in FIG. 1. Thus, normally the screen image in the notebook PC mode is displayed in a "landscape" orientation, while the screen image in the tablet PC mode is displayed in a "portrait" orientation. The reorientation of the image may be automatically implemented by the computer operating system.

When Computer 10 is in the tablet mode, as shown in FIG. 7, aperture 331a of attachment unit 33 on unit 30 faces upward. Aperture 331a is positioned adjacent to display screen 31. As shown in FIG. 1, when computer 10 is in the notebook mode first fixture 332a projects from the aperture 331a, In contrast, when in the tablet mode no fixture projects from the aperture 331a as shown in FIG. 7. Instead, when the computer is in the tablet mode another fixture projects from the aperture 331b (refer to FIG. 5) on the back of the second unit 30, and is engaged in the engagement hole 251 (shown in FIG. 1) of the base unit 20. In the engaged status, display unit 30 is securely held by base unit 20 until the engagement release button 252 is operated. When the display unit is engaged in the manner shown in FIG. 7, computer 10 can be used as a tablet PC having a planar housing.

Engaging Unit and Fixture Unit

Figure 8:
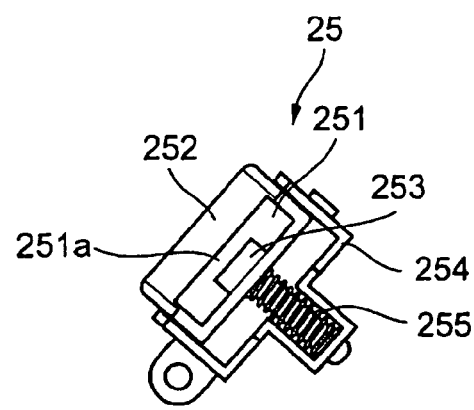
FIG. 8 is a plan view showing an engagement mechanism of the present invention.

FIG. 8 shows a preferred embodiment of an engagement mechanism 25 provided in base unit 20. Engagement mechanism 25 has an engagement hole or aperture 251. An engagement detent 253 extends from a side into engagement hole 251, and an engagement release button 252 is positioned adjacent to the engagement hole 251 on the side opposite the detent. Engagement release button 252 and engagement detent 253 are integrally formed as one piece (hereinafter referred to as an engagement part). Engagement hole 251 is formed at the center of the engagement part. The engagement part is slidably held in a frame 254, and the engagement release button 252 is urged by a spring 255 towards the direction of release button 252.

The top surface of the engagement detent 253 is tapered. When a fixture such as fixture 332a or fixture 332b (shown, for example in FIGS. 9A, 9B and 1) of the attachment unit 33 enters engagement hole 251, the fixture exerts force on the tapered portion of engagement detent 253, causing spring 255 to compress such that the engagement part slides out of the way of the fixture. As shown in FIGS. 9A and 9B, the fixtures have an aperture or hole formed therein which is sufficiently large to accept engagement detent 253. As the fixture travels into engagement hole 251, the hole in the fixture becomes aligned with engagement detent. This allows spring 255 to release causing detent 253 to enter the hole in the fixture, such that the fixture to securely engage engagement detent 253. The fixture is thereby locked in position by engagement mechanism 25. When the engagement release button 252 is pressed, the engagement part compresses spring 255 and moves detent 253 out of the hole in the fixture. The fixture may then be removed from engagement hole 251.

FIGS. 9A and 9B show the attachment unit provided in display unit 30, including a fixture. FIGS. 10A and 10B show the fixture used with the attachment unit of FIGS. 9A and 9B. FIGS. 11A and 11B additional components of a cover member for use with the fixture.

As most clearly depicted in FIGS. 9A and 9B, attachment unit 33 comprises a fixture member 332 and a cover member 333. FIGS. 10A and 10B respectively show the two sides of fixture member 332 which are substantially identical. Fixture member 332 is provided with first and second portions 332*a*, 332*b* which face in the directions different by 90°. Between the fixture portions is a projection 332*c* which serves as a rotation axis. Two substantially identical concave sections 332*d* and 332*e* are formed at an equal distance from projection 332*c*. Concave sections 332*d* and 332*e* are connected by an arcuate groove 332*f* which is shallower than the two concave sections 332*d* and 332*e*.

FIG. 11A shows a cut-away view of the cover member. FIG. 11B shows the inner side of the cover of the cut off portion. Cover member 333 has two opposite plate sections 333*a* and 333*b*. Each of plate sections 333*a* and 333*b* contains a support hole 333*c* to engage projection 332*c* of fixture member 332 such that fixture member 332 can be rotated within the cover. A convex projection 333*d* is formed on interior surface of two plate sections 333*a* and 333*b*. When the fixture member 332 is positioned in cover member 333, convex section 333*d* engages either first concave section 332*d* or second concave section 332*e*, or during the rotation of the fixture member 332, the convex section 333*d* is located within arcuate groove 332*f*. On both sides of the cover member 333, a tip section 333*g* having an attachment hole is provided.

Fixture member 332 is positioned within cover member 333, by inserting it between the two plate sections 333*a* and 333*b* of the cover member 333. The plate sections 333*a* and 333*b* expand allowing fixture member 332 to enter the space between the plate sections 333*a* and 333*b*, and projection 332*c* enters the support hole 333*c*. Simultaneously, convex section 333*d* provided inside the two plate sections 333*a* and 333*b* is engaged in the first concave section 332*d* or the second concave section 332*e* of the fixture member 332. The fixture member 332 can then rotate by 90°. During rotation, convex section 333*d* of cover member 333 travels in arcuate groove 332*f*. Since arcuate groove 332*f* is shallower than the first concave section 332*d* or the second concave section 332*e*, the two plate sections 333*a* and 333*b* are expanded slightly outward during the rotation. When the convex section 333*d* enters either of first or second concave sections 332*d*, 332*e* the user can feel the fixture member "click" into position. Since the concave sections deeper than arcuate groove 332*f*, cover member 333 holds the fixture member 332 in position when convex projection 333*d* is engaged in either first or second concave section 332*d*, 332*e*. Thus, in order to rotate fixture member 332 it is necessary to apply a slight force.

Two apertures 331*a* and 331*b* shown in FIGS. 9A, 9B, 12A and 12B are formed on the sides of cover member 333 by plate sections 333*a* and 333*b*. By rotating fixture member 332 as previously described, either first or second fixture portions 332*a* or 332*b* will extend from aperture 331*a* or 331*b* as shown. The other fixture portion, that is the portion that does not project outwardly, is retained between plate sections 333*a* and 333*b*.

Figure 9:
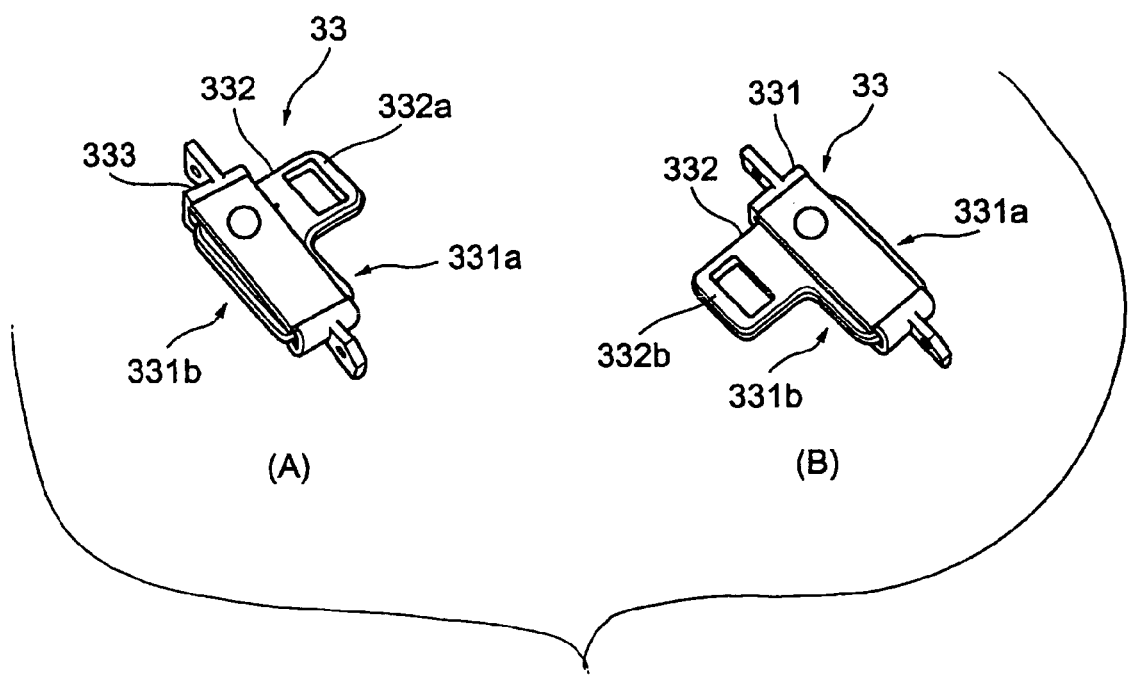
FIGS. 9A and 9B are perspective views of an attachment mechanism for use with the engagement mechanism of FIG. 8.
Figure 10:
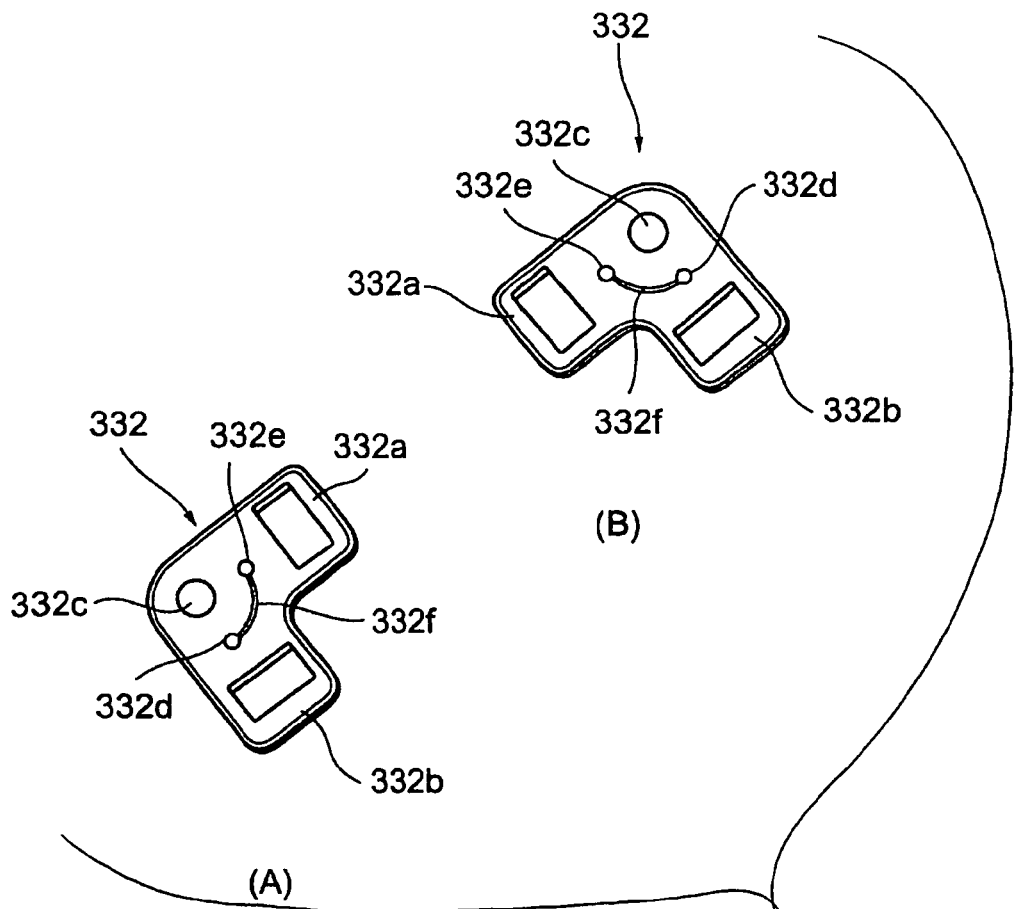
FIGS. 10A and 10B are perspective views of a component of the attachment mechanism of FIGS. 9A and 9B.
Figure 11:
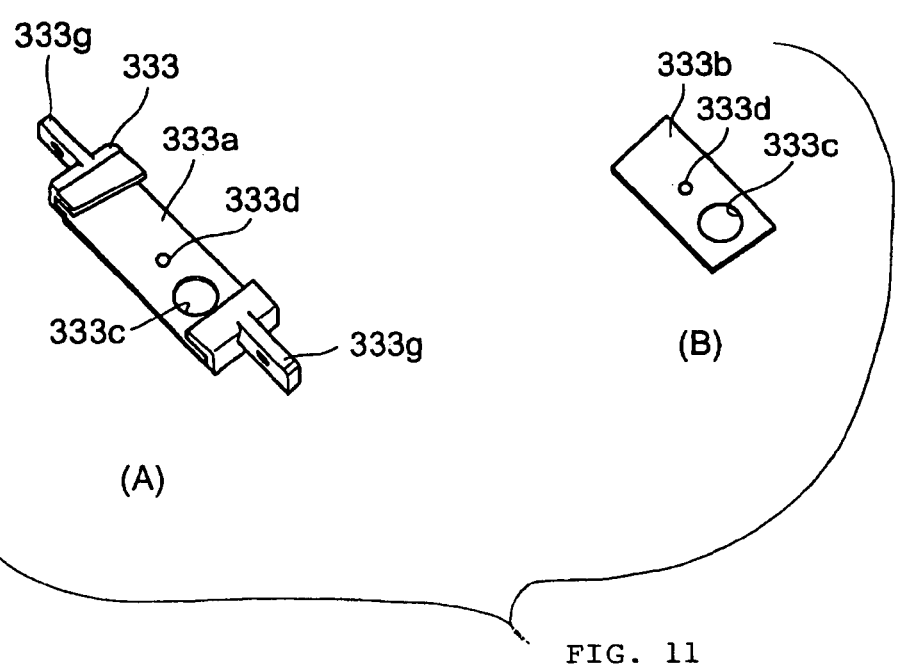
FIG. 11A shows a cut-away view of the cover member of the attachment mechanism of FIGS. 9A and 9B.
FIG. 11B shows the inner side of the cut away portion.

When first fixture portion 332*a* is rotated from the position of FIG. 9A, convex sections 333*d* shown in FIG. 11 are removed from the first concave section 332*d* shown in FIG. 10 with the feeling of click, the convex section 333*d* travels on the arcuate grooves 332*f*. After rotating 90° and convex sections 333*d* engage second concave sections 332*e* shown in FIGS. 10A and B and click into position. At this time, as depicted in FIG. 9B, second fixture portion 332*b* projects from the aperture 331*b* and first fixture portion 332*a* is stored between two plate sections 333*a* and 33*b*.

In order to enter the first closed status shown in FIG. 5, the fixture member is rotated such that first fixture portion 332*a* of fixture member 332 of attachment unit 33 projects from aperture 331*a* of display screen 31 (see FIG. 4), and display unit 30 is rotated onto the top of base unit 20 such that display screen 31 faces base unit 20. In this position, first fixture portion 332*a* extends into engagement hole 251 of engagement mechanism 25 in the base unit, and first fixture 332*a* is engaged in the engagement mechanism 25 as explained above in reference to FIG. 8. The display unit is held securely in position until it is released by pressing the engagement release button 252.

To use computer 10 in the tablet PC mode as shown in FIG. 7 (i.e., in the second closed position), the fixture member is rotated such that second fixture portion 332*b* of fixture member 332 of attachment unit 33 projects from aperture 331*b* (see FIG. 5) on the back of display unit 30. Display unit 30 is rotated such that display screen 31 faces upward from the base unit, and is further rotated onto the top of the base unit such that the back of the display unit 30 faces the base unit 20. In this position, second fixture portion 332*b* extends into engagement hole 251 of the engagement mechanism 25, thereby securely fixing the apparatus in the tablet mode shown in FIG. 7. Thus display unit can be securely held by fixture member 332 in either the first or second closed positions by rotation of fixture member. Rotation of the fixture member can be performed by a simple manipulation of the user's fingers, thereby allowing use in either the notebook PC mode and the tablet mode using a single hand.

Second Embodiment of Fixture Unit.

Figure 12:
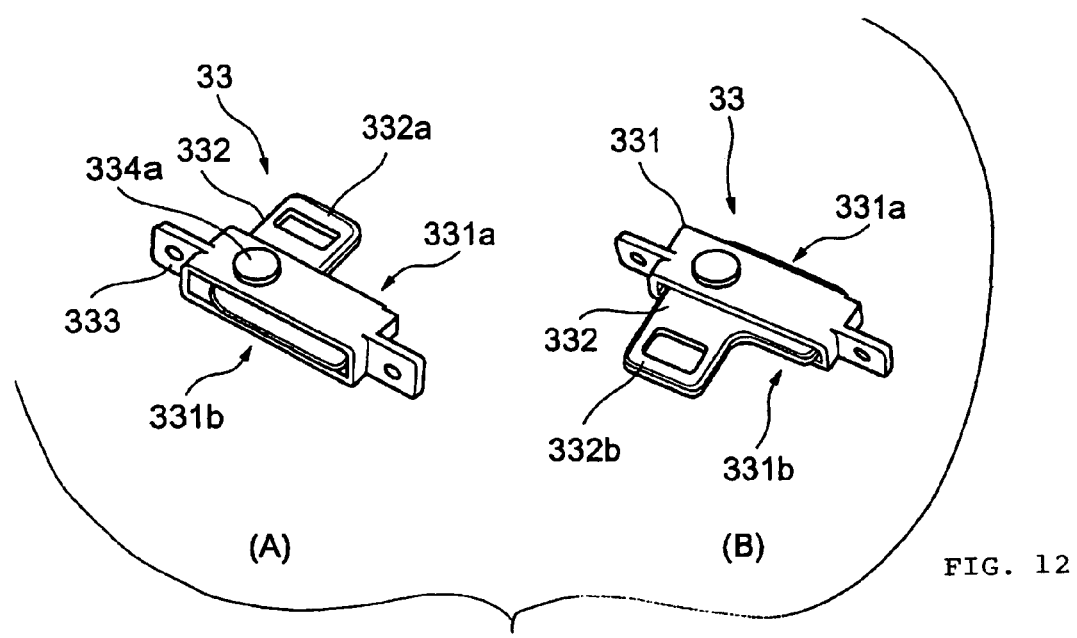
FIGS. 12A and 12B are perspective illustrations of another embodiment of an attachment mechanism for use with the engagement mechanism of FIG. 8.
Figure 14:
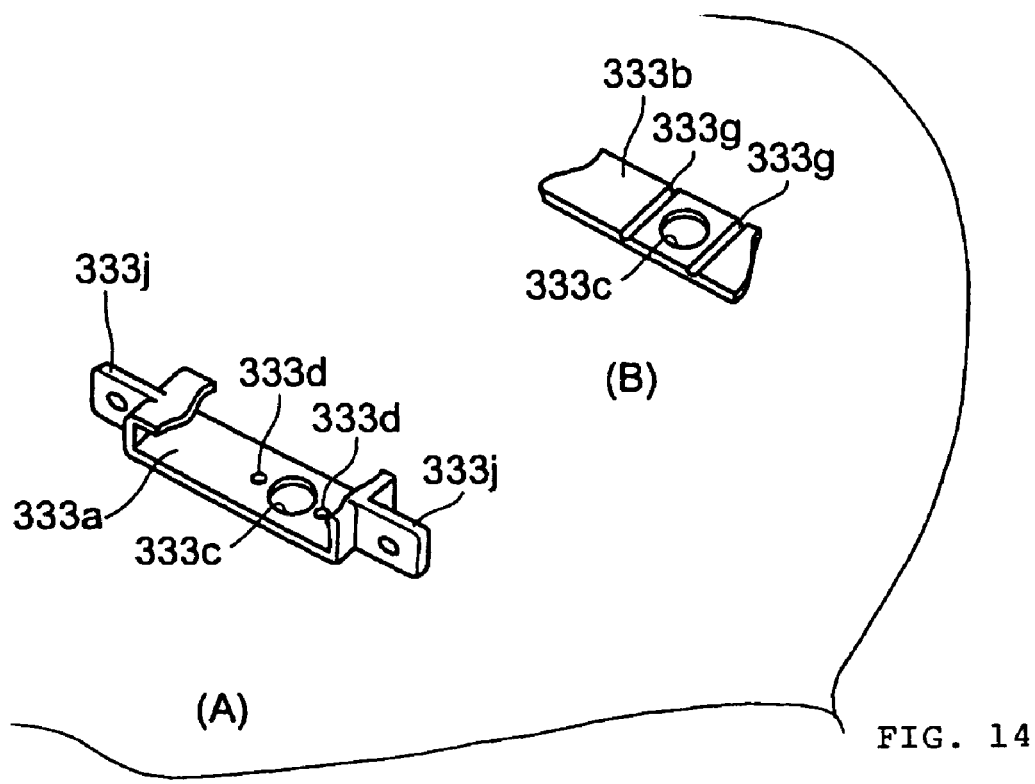
FIG. 14A shows a cut-away view of the cover member of the attachment mechanism of FIGS. 12A and 12B.
FIG. 14B shows the inner side of the cut away portion.
Figure 15:
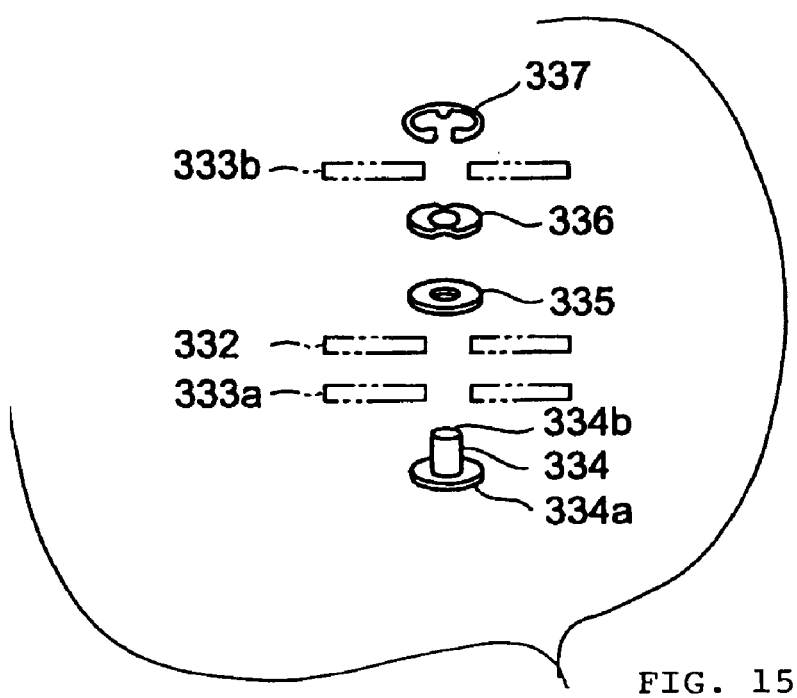
FIG. 15 is a exploded view of the attachment mechanism of FIGS. 12A and 12B.

FIGS. 12A and 12B show opposing sides of an alternative embodiment of a fixture unit of the present invention; FIGS. 13A and 13B show opposing sides of fixture member component of the fixture unit; FIGS. 14A and 14B shows opposing sides of the cover member component of the fixture unit; and FIG. 15 is an exploded view showing the procedure of assembling the fixture unit. In this alternative embodiment, the components corresponding to those of the fixture unit explained by referring to FIGS. 9-11 are assigned the reference numerals.

FIGS. 12A and 12B show the fixture unit corresponding to FIGS. 9A and 9B, and their functions are the same as those described above and, therefore, are not repeated. However, FIGS. 12A and B show a difference in the head section 334*a* of axis member 334 (refer to FIG. 15). The axis member 334 is described later.

Figure 13:
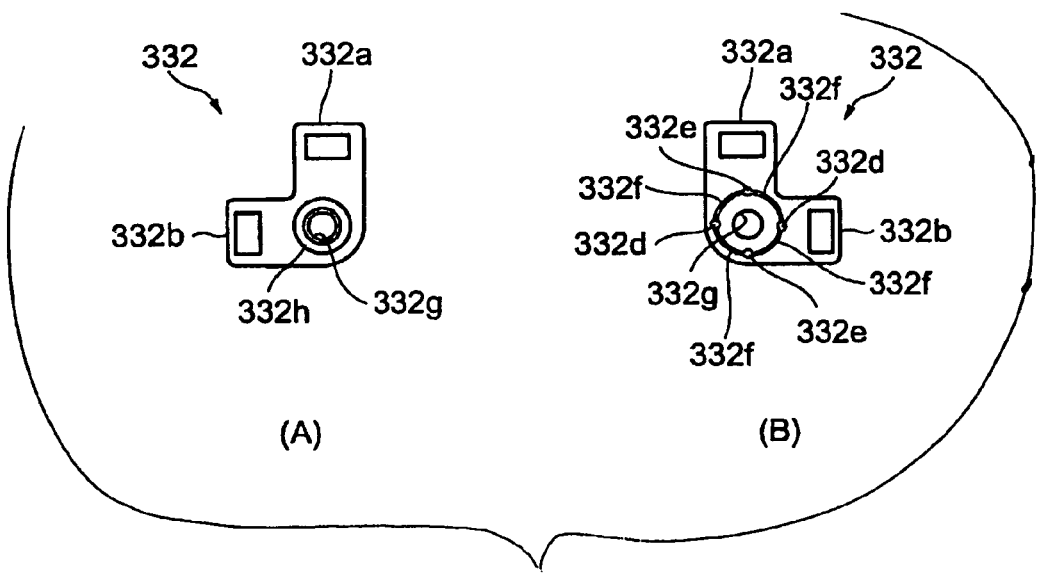
FIGS. 13A and 13B are perspective views of a component of the attachment mechanism of FIGS. 12A and 12B.

As shown in FIG. 13, fixture member 332 comprises a bearing hole 332*g* for insertion of axis member 334 (refer to FIG. 5) is formed between first fixture portion 332*a* and second fixture portion 332*b*. On the side depicted in FIG. 13A, a circular concave section 332*h* in which a plain washer 335 (see FIG. 15) is engaged is formed. On the side depicted in FIG. 13B, two first concave sections 332*d* and two second concave sections 332*e* are formed around bearing hole 332*g*. First concave sections 332*d* and second concave sections 332*e* are coupled by arcuate groove 332*f* shallower than any of concave sections. First and second concave sections 332*d*, 332*e* are formed in two units, and are formed only on one side of the fixture member 332. Otherwise, they operate in a manner similar to that previously described.

FIGS. 14A and B show the cover member of the alternative embodiment of the fixture unit. FIG. 14A shows a cutout in a plate section 333*b*, and FIG. 14B shows the inner side of the plate section 333*b* having the cutout. In the alternative embodiment there are two convex projections 333d in the plate section 333a which engage either the first concave section 332d or the second concave section 332e (see FIG. 13). Ridges 333g are formed adjacent to both sides of the support hole 333c inside plate section 333b to moderate the spring effect of a wavy washer 336 (see FIG. 15) by slightly deforming the part when the fixture member 332 is rotated.

As shown in FIG. 15, when assembling the fixture unit, fixture member 332, flat washer 335, and wavy washer 336, which functions as a spring, are enclosed between cover members 333. Fixture member 332 is arranged facing the plate section 333a as shown in FIG. 13B. Axis member 334 is then inserted through the components and the tip 334b of the axis member 334 is engaged in an E ring 337.

In this embodiment of the fixture unit, wavy washer 336 works as a spring, so that it is not necessary to depend on the spring force of the cover member 333, thereby improving the flexibility in selection and design of materials.

Open/Close Sensor

When computer 10, in the notebook PC mode (see FIG. 1), is closed in the first closed status (see FIG. 5) with the power turned on, internal circuitry in the computer causes it to enter "standby" status. On the other hand, when computer 10 is closed in the second closed status (see FIG. 7) with the power, on such that it enters the tablet mode, the orientation of the image on the display screen 31 in the note PC mode is automatically rotated by 90°. To realize these functions, the electronic apparatus 10 shown in FIG. 1 is provided with an open/close sensor for detecting the opened or closed status, as described below.

Figure 16:
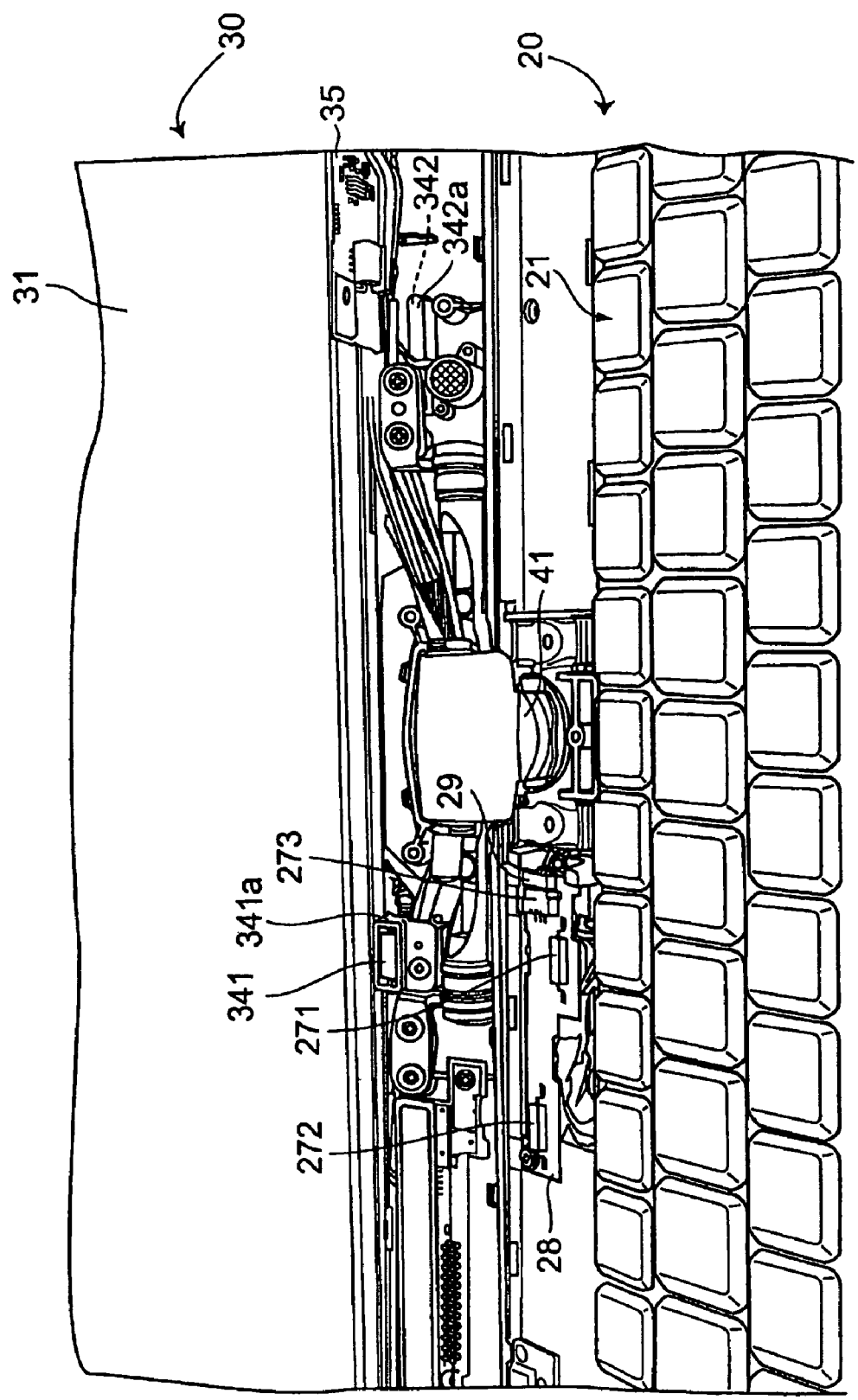
FIG. 16 is an enlarged view of the vicinity of the coupling section of an embodiment of the convertible PC of the present invention.

FIG. 16 is an enlarged view of the vicinity of the coupling section 40 of computer 10. FIG. 16 shows computer 10 in the first closed status, i.e., with display screen 31 facing keyboard 21, without a cover at the back portion of the keyboard 21 and the lower portion of the display screen.

A circuit substrate 28 comprises a first magnetic sensor 271 and a second magnetic sensor 272 adjacent to rotation axis 41. In the preferred embodiment, both first and second magnetic sensors 271, 272 are positioned on circuit substrate 28 to facilitate positioning of the sensors reducing the cost of manufacture. Circuit substrate 28 is also provided with a connector 273 for transmission of a detected signal of first magnetic sensor 271 and second magnetic sensor 272 to the internal circuit of the first unit 20. Connector 273 is combined with a connector 29 connected to the tip of the lead line from the circuit in the base unit 20. Signals from first and second magnetic sensors 271, 272 are transmitted to circuitry in first unit 20 through the connectors 273 and 29.

A first magnet 341 is arranged in the position below the display screen 31 of the second unit 30, which is positioned over first magnetic sensor 271 when the second unit 30 is closed as shown in FIG. 5. First magnet 341 is in a case 341a with an opening which allows it to provide a strong magnetic force toward the same direction of the display screen 31. By changing computer 10 from the open status shown in FIG. 1 to the first closed status shown in FIG. 5, the first magnet 341 comes into position adjacent first magnetic sensor 271, the first magnetic sensor 271 detects the magnetic force, and the first closed status is detected.

In addition, a second magnet 342 is positioned on the other side of axis 41. The back of a case 342a holding second magnet 342 is shown in FIG. 16. Case 342a has an aperture (not shown in the attached drawings) on the back of the display screen 31, and the second magnet 342 is exposed from the aperture toward the back of the display screen. Therefore, the second magnet 342 has strong magnetic force backwards from the display screen.

In FIG. 16 circuit substrate 35 is lifted out of the way to reveal the position of the second magnet 342. However, the circuit substrate 35 is arranged in a position in which the back of the case 342a storing the second magnet 342 is hidden.

Figure 17:
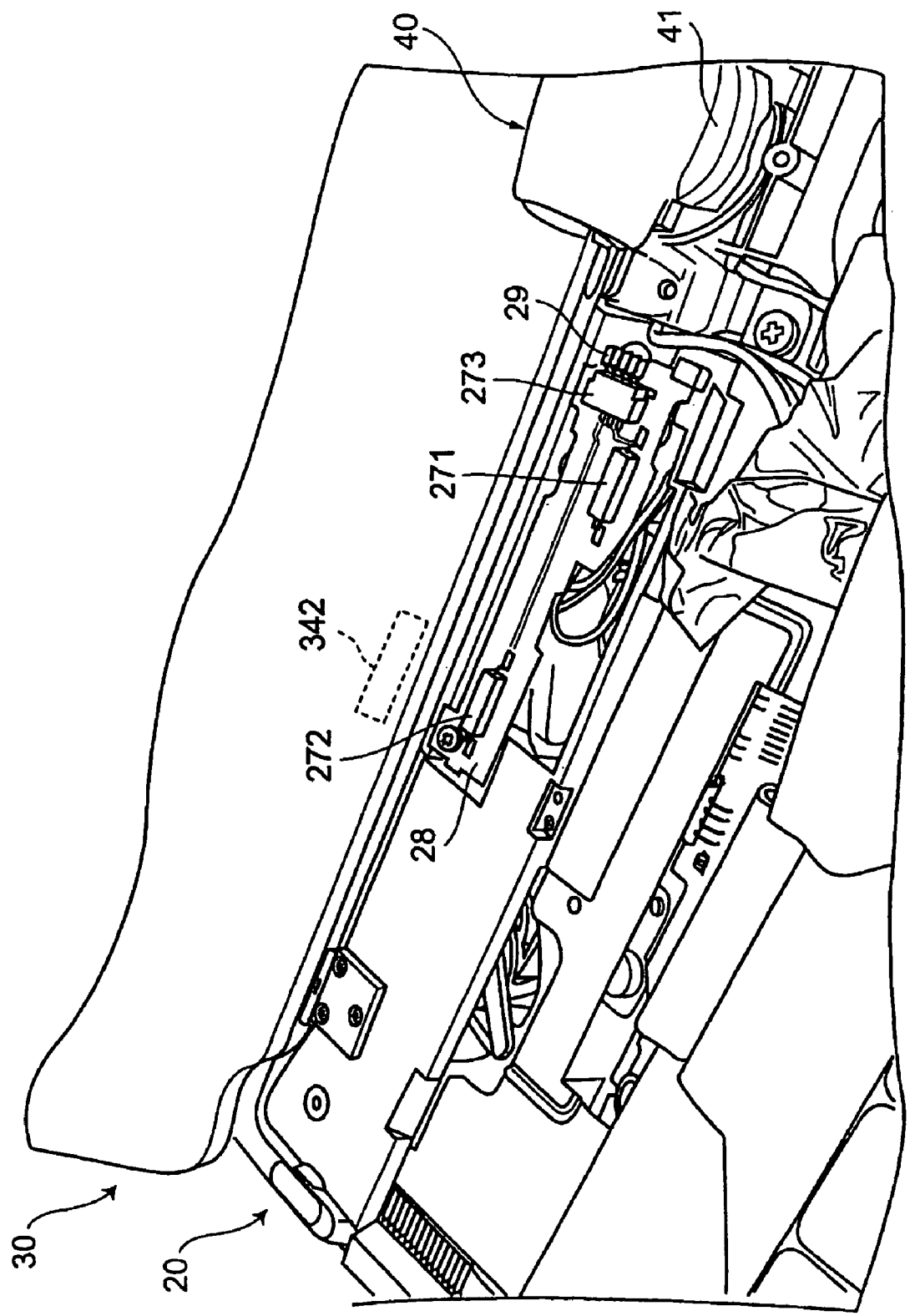
FIG. 17 shows the display is rotated by 180° from the position shown in FIG. 16.

FIG. 17 shows the second unit 30 (display screen 31) rotated by 180° to allow the back of second unit 30 to face keyboard 21. As shown in FIG. 17, when the back of second unit 30 faces first unit 20, second magnet 342 is moved to position corresponding to the second magnetic sensor 272. The material of the back cover of second unit 30 is selected to allow the magnetic force to pass without appreciable reduction in intensity, such that when second unit 30 is laid on first unit 20 with the back cover facing the first unit, second magnet 342 is positioned adjacent to second magnetic sensor 272, and the second closed status (tablet mode) can be detected.

Figure 18:
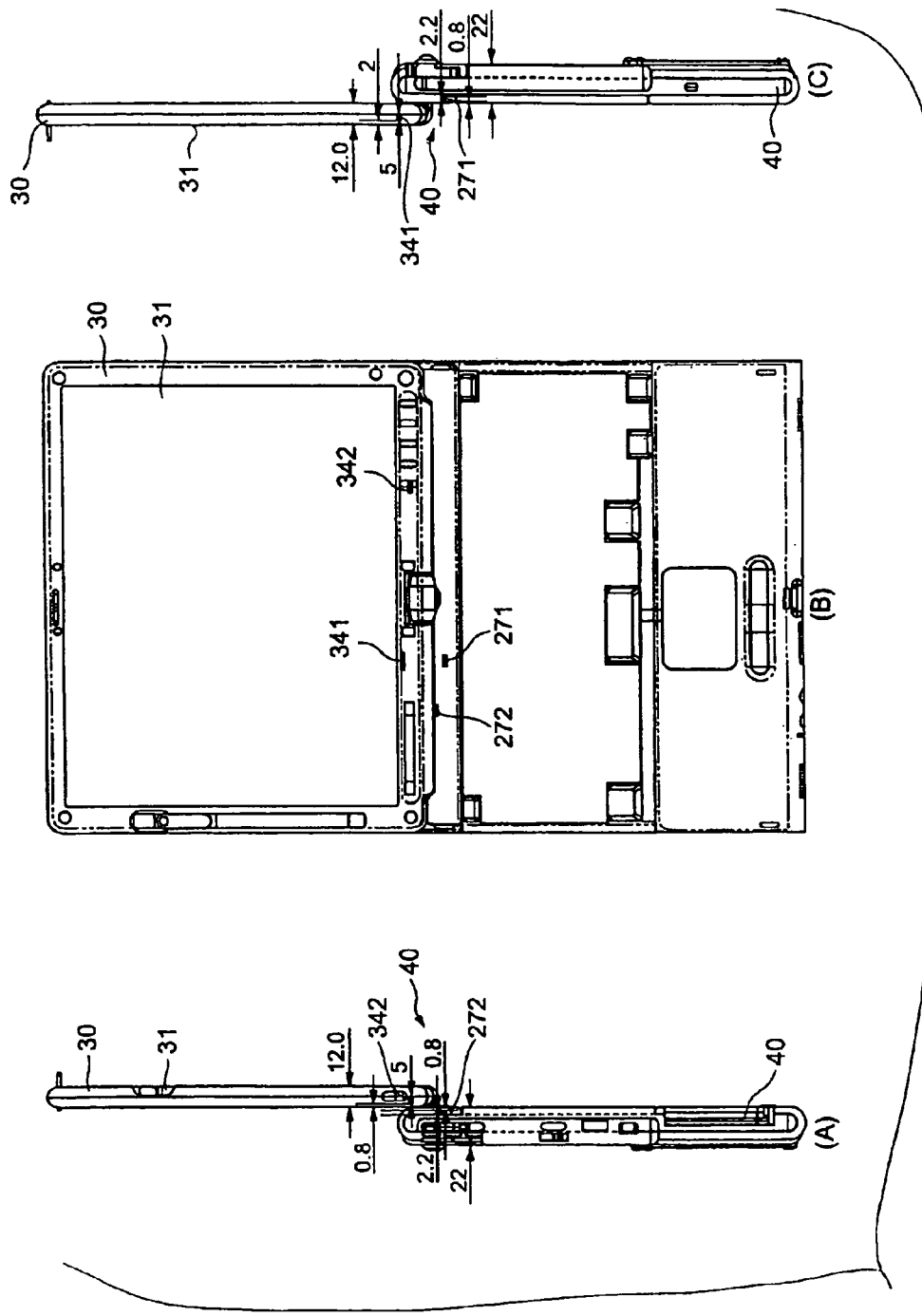
FIGS. 18A, B and C show first side, top and second side views in which the display is opened by 180° relative to the keyboard.

FIGS. 18A-C shows second unit 30 opened by 180° relative to the first unit 20. FIG. 18A is a left side view, FIG. 18B is a plan view, and FIG. 18C is a right side view. In an actual embodiment of the present invention, the thickness of the first unit 20 is 22 mm, and first and second magnetic sensors 271, 272 are positioned 0.8 mm deeper than the surface of the keyboard. The magnetic sensors are each 2.2 mm thick. Thus, the first magnetic sensor 271 and the second magnetic sensor 272 are positioned close to surface of the keyboard within the thickness of the first unit 20. The thickness of second unit 30 is 12 mm, and first magnet 341 is arranged at a depth of 2 mm from the surface of the display screen 31. The thickness of first magnet 341 is 5 mm including case 341a. Thus, first magnet 341 is positioned close to the surface of the display screen 31 within the thickness of the second unit 30. Second magnet 342 is positioned 0.8 mm from the back of the second unit 30, and the thickness of the second magnet 342 is 5 mm including the case 342a. Thus, second magnet 342 is positioned close to the back, within the thickness of the second unit 30.

Therefore, in the first closed status, the first magnet 341 is close to the first magnetic sensor 271 and applies a strong magnetic force to the first magnetic sensor 271 and in the second closed status, the second magnet 342 is close to the second magnetic sensor 272, and applies strong magnetic force to the second magnetic sensor 272. Thus, according to the embodiment, a strong magnetic force is applied to one or the other of the magnetic sensors, with a high signal to noise ratio.

In the actual embodiment described, the residual flux density Br of the first magnet 341 and the second magnet 342 is Br=0.41 to 0.43 (T). When entering the first closed status, first magnetic sensor 271 detects the magnetic force of first magnet 341 when the space between the longest portions (near the engagement mechanism 25 and the attachment unit 33) from coupling section 40 reaches 15 mm to 30 mm. When entering the second closed status, second magnetic sensor 272 detects the magnetic force of second magnet 342 when the space reaches 20 mm to 40 mm.

The first magnetic sensor 271 and the second magnetic sensor 272 are placed on the side of the coupling section 40 beyond the keyboard 21. Therefore, the wrist of a user is not placed on the magnetic sensor in the normal use condition to prevent the possibility that a user with a magnetic bracelet can cause a malfunction.

Display Panel Fixed Structure

Figure 19:
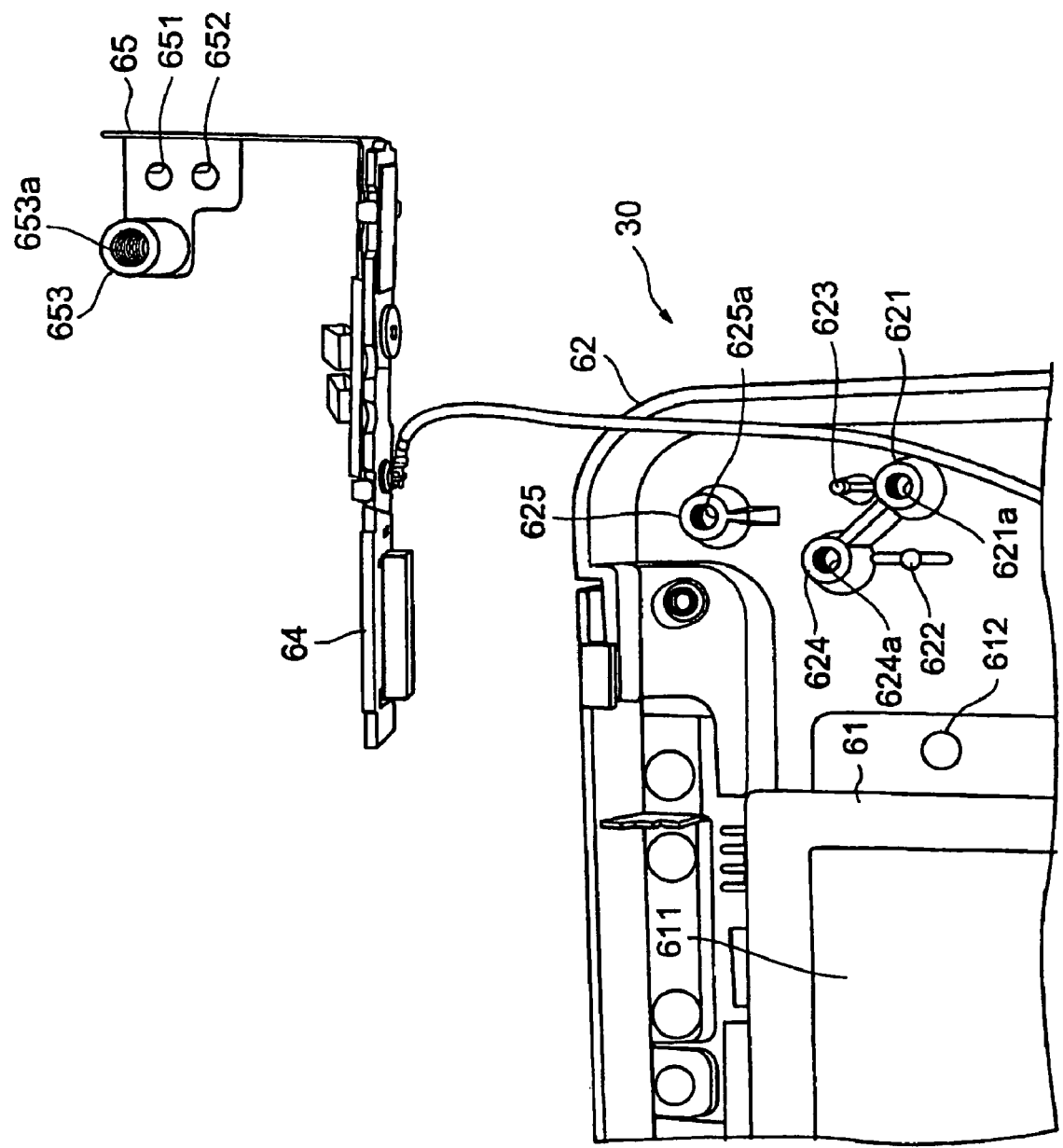
FIG. 19 shows the upper right portion of the back cover and the display panel of convertible PC of the present invention.
Figure 20:
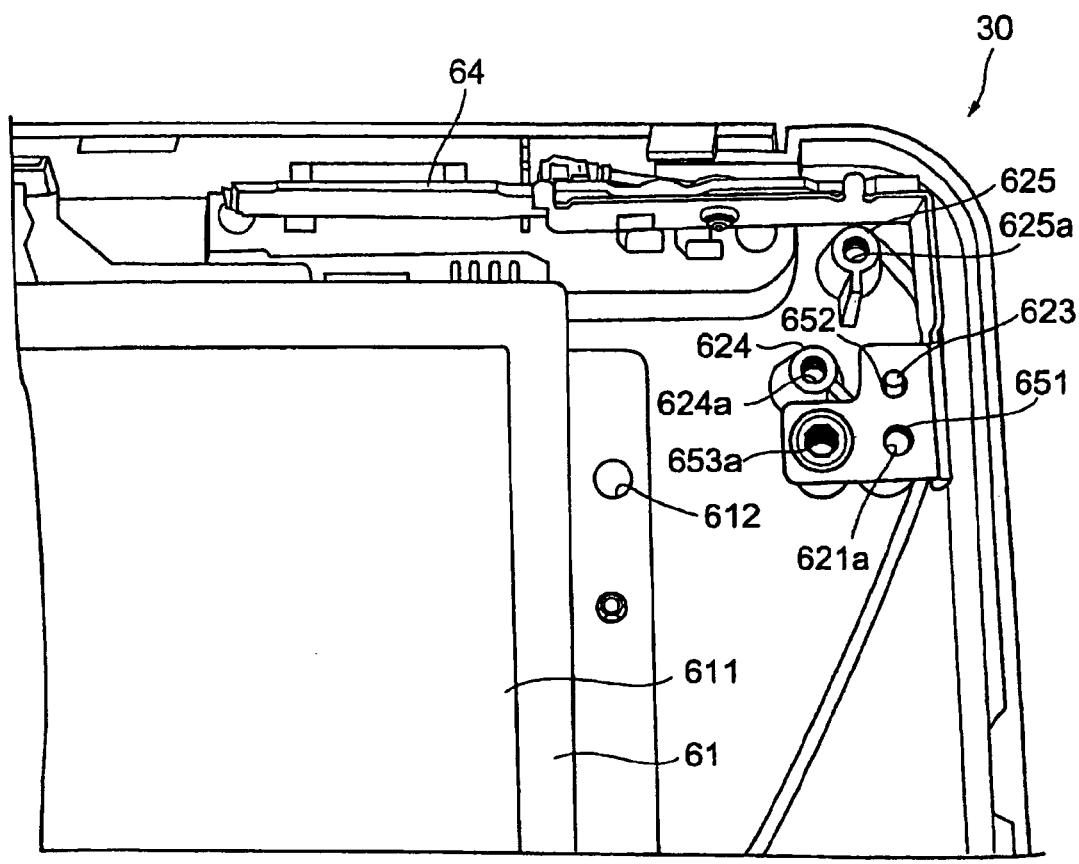
FIG. 20 is another view of what is shown FIG. 19.
Figure 21:
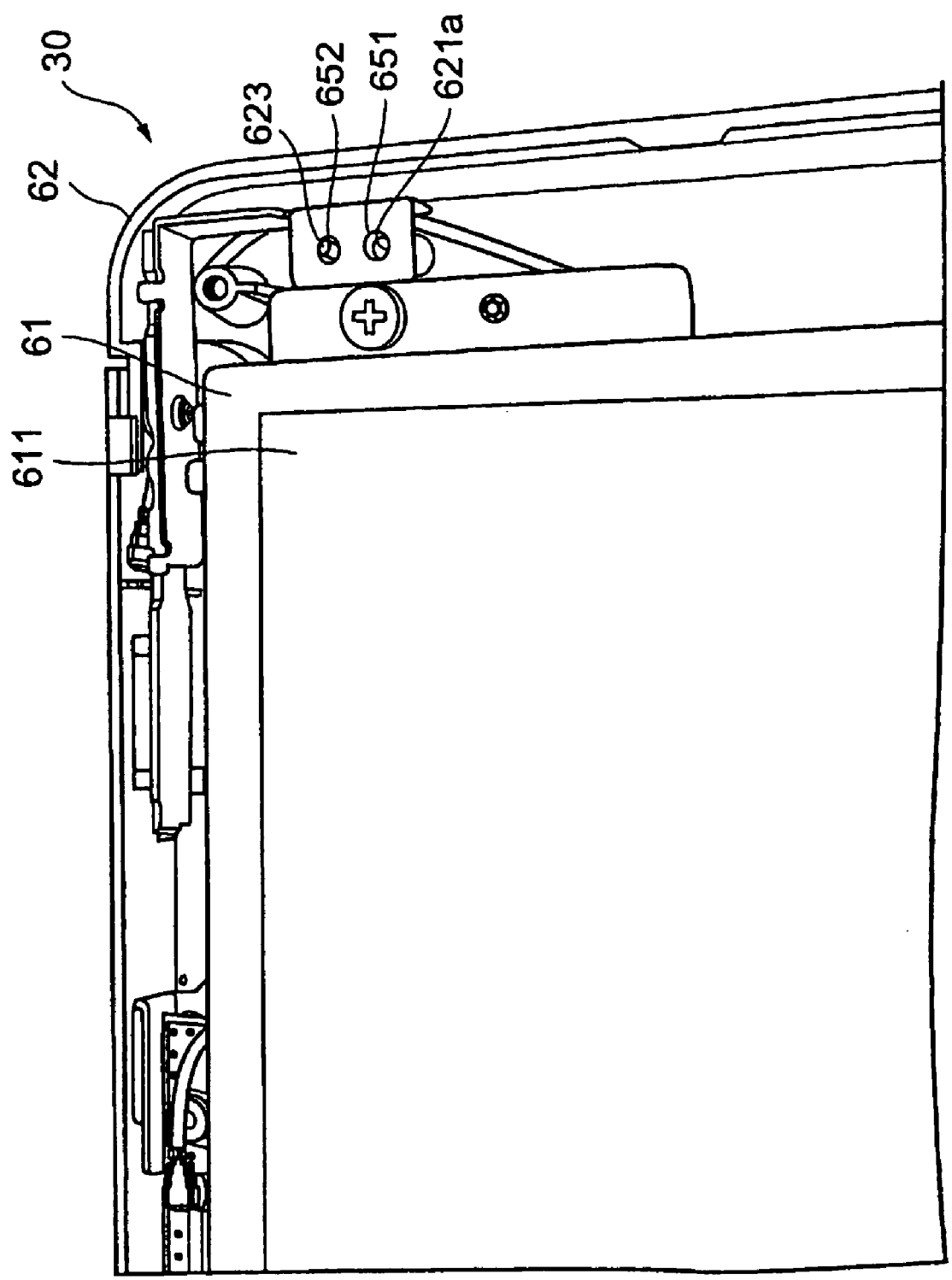
FIG. 21 is another view of what is shown in FIGS. 19 and 20.

FIG. 19 shows the upper right portion of the back cover and the display panel of the second unit 30 of computer 10 prior to assembly together. In FIG. 19, an antenna 64 and a fixing part 65 are shown prior to engagement in a back cover 62, and the display panel 61 is also not in final position. FIG. 20 shows the same portion as FIG. 19, but antenna 64 and fixing part 65 in their normal positions. FIG. 21 shows the same portion as FIGS. 19 and 20, with antenna 64, fixing part 65, and display panel 61 arranged in their normal positions. The components of display unit 30, i.e., the display panel 61 comprising display screen 611 and back cover 62 covering the back of display panel 61 are shown. The front side of display panel 61 is covered with front cover 63. As shown in FIG. 19, antenna 64 is attached to fixing part 65. Fixing part 65 is used to attach antenna 64 and display panel 61.

Display panel 61 has a mounting hole 612 for a screw. A boss 621 having a central screw hole 621a for fixing display panel 61 is located on back cover 62. Boss 621 is offset from mounting hole 612 of display panel 61. On the central axis of mounting hole 612, used when display panel 61 is in its normal position, a positioning pin 622 is located on back cover 62. In addition, projection 623 is provided on back cover 62. A boss 624 having a central screw hole 624a, and a boss 625 having a central screw hole 625a are also provided.

Fixing part 65 comprises a mounting hole 651 and a positioning hole 652 to which the antenna 64 is fixed, and a boss 653 having a screw hole 653a penetrated at a center. The aperture (see FIG. 19) at the bottom of screw hole 653a penetrated at the center of boss 653 and is used as a positioning hole in which the positioning pin 622 of the back cover 62 is engaged. The aperture (see FIG. 20) at the top of screw hole 653a is penetrated at the center of the boss 653 and is used as a screw hole in which mounting hole 612 of the display panel 61 is arranged and screwed.

Fixing part 65 is arranged as shown in FIG. 20. The aperture of the bottom of screw hole 653a is penetrated at the center of the boss 653 for engagement with positioning pin 622 (see FIG. 19). Thus, mounting hole 651 of fixing part 65 is arranged on screw hole 621a at the center of boss 621 provided for back cover 62, and projection 623 provided in the back cover 62 is engaged in positioning hole 652 of fixing part 65. Positioning hole 652 of fixing part 65 is formed large for loose engagement of projection 623 of antenna 64, and mounting hole 651 of fixing part 65 is also formed large for diameter of the central screw hole 621a of boss 621 provided in back cover 62. Correspondingly, the diameter of screw hole 653a at the center of boss 653 of fixing part 65 matches positioning pin 622 of back cover 62 in dimension. Therefore, screw hole 653a in the center of boss 653 of fixing part 65 is arranged in the correct position for positioning pin 622 of back cover 62.

As shown in FIG. 21, mounting hole 612 (see FIG. 20) of display panel 61 is placed and screwed into screw hole 653a (refer to FIG. 20) of fixing part 65. At this time, mounting hole 612 of display panel 61, screw hole 653a in the center of boss 653 of fixing part 65, and the positioning pin 622 of back cover 62 are coaxial. Boss 621 for fixing the display panel 61 is provided on back cover 62 in the position of mounting hole 612 of display panel 61, as described above. However, positioning pin 622 is set on the same central axis as mounting hole 612 of display panel 61 when display panel 61 is arranged in the normal position on back cover 62 and positioning pin 622 is engaged in positioning hole (i.e., the aperture at the bottom of screw hole 653a in the center of boss 653) of fixing part 65, and mounting hole 612 of display panel 61 is screwed to the screw hole (i.e., the aperture at the upper portion of screw hole 653a in the center of boss 653) coaxial with the positioning hole (aperture at the bottom portion), thereby fixing display panel 61 in the normal position with high precision.

In the embodiment described, only one type of the display panel 61 is shown, but another type of display panel having a different mounting hole position can be incorporated into the back cover having the same structure. The other type of display panel may be directly screwed into screw hole 624a when a mounting hole is positioned in the same central axis as screw hole 624a in the center of boss 624 (see FIG. 19) and the display panel is incorporated.

If a boss for screwing display panel 61 is located in the position of positioning pin 622 of back cover 62, then the boss interferes with the display panel of the type which directly screws into the screw hole 624a. Therefore, such a display panel cannot be incorporated. In the illustrated embodiment, positioning pin 622 is set corresponding to mounting hole 612 of display panel 61, and screw hole 621a for fixing display panel 61 to back cover 62 is provided with boss 621 arranged in a different position, such that the connections are made by fixing part 65. In connecting fixing part 65, screw hole 653a in positioning hole 652 of fixing part 65 is registered with positioning pin 622 of back cover 62 as described above, and attachment be made with almost the same high position precision as by directly screwing into the central screw hole provided to the back cover 62.

When a display panel of the type which directly screws into central screw hole 624a of boss 624 is incorporated into central screw hole 624a, boss 653 or a metal fixture having no planar portion for fixture of the boss 653 is used instead of fixing part 65 with the structure shown in FIG. 19. This is because the display panel of the type which directly screws into the central screw hole of boss 624 interferes when a boss is set in the position of the positioning pin 622 of the back cover 62, and the spread of the fixing part as describe above interferes with the incorporation of the display panel.

Another boss 625 shown in FIGS. 19 to 21 is used in fixing the front cover 63 (see FIG. 1). FIGS. 19 to 21 show the fixed structure of the upper right portion of a display panel. The structure at the upper left portion of the display panel is almost the same, except there is no antenna and, therefore, will not be described.

Figure 22:
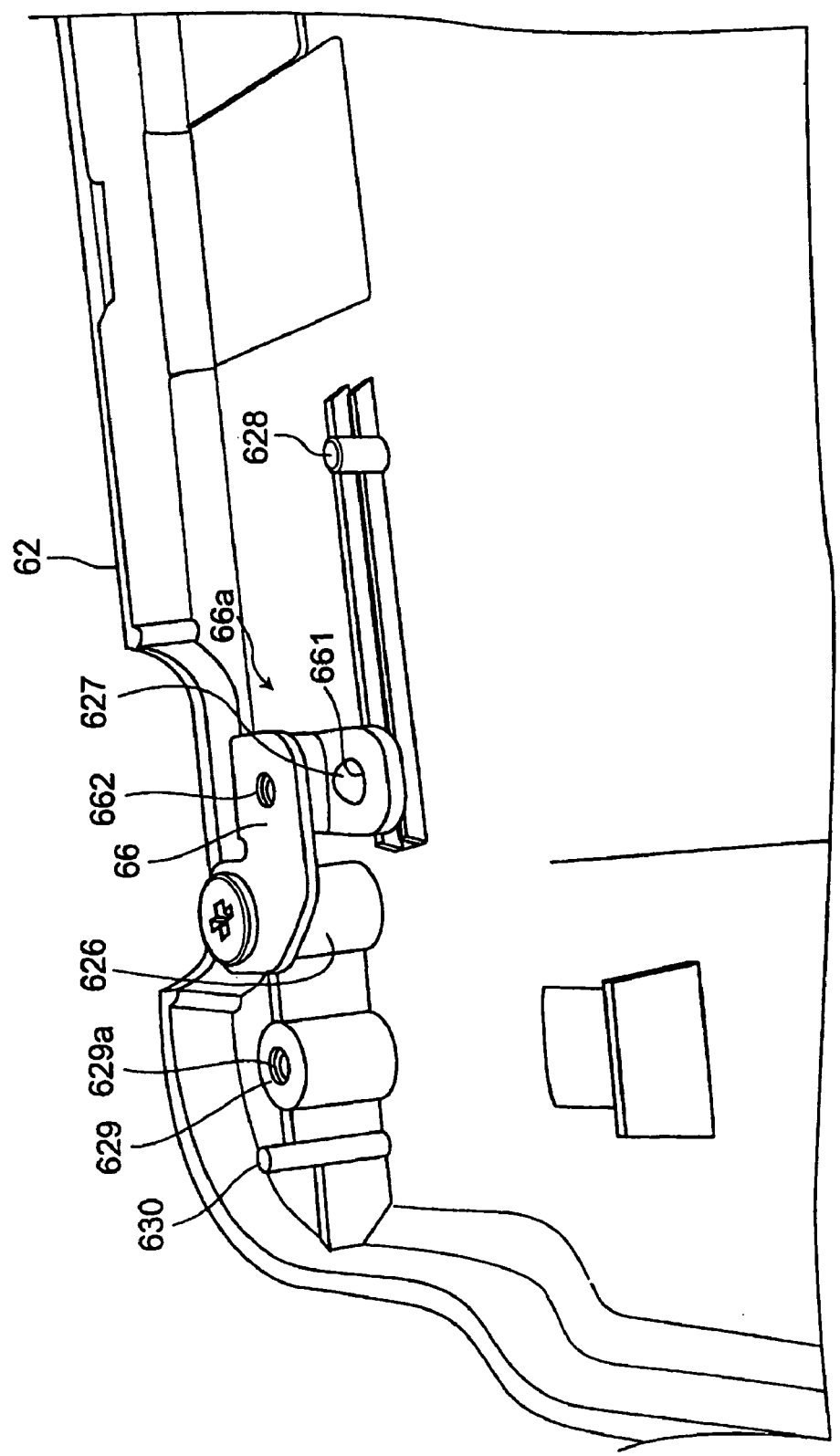
FIG. 22 shows the structure of the lower left portion of the display panel.
Figure 23:
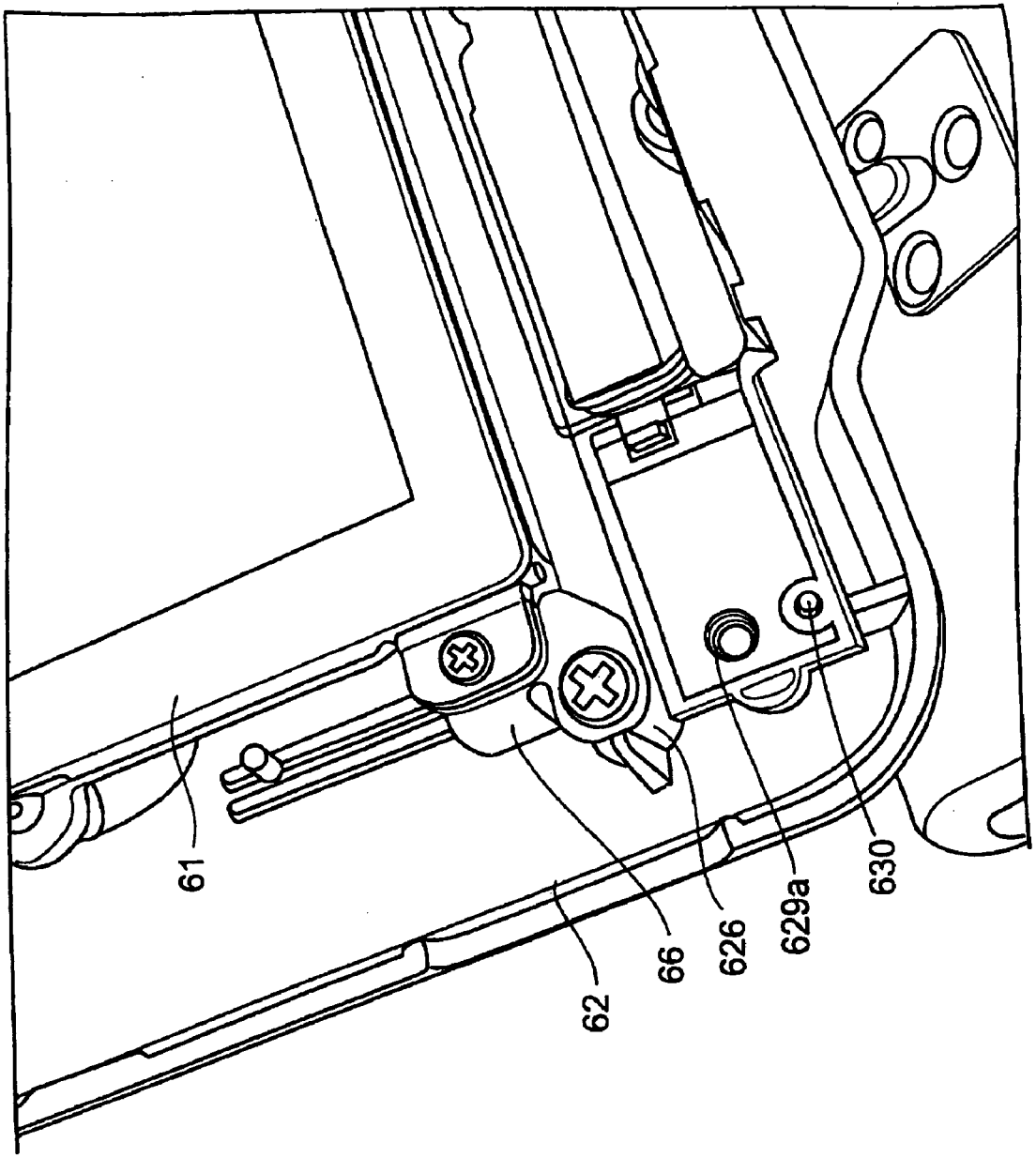
FIG. 23 is another view which shows the structure of the lower left portion of the display panel.
Figure 24:
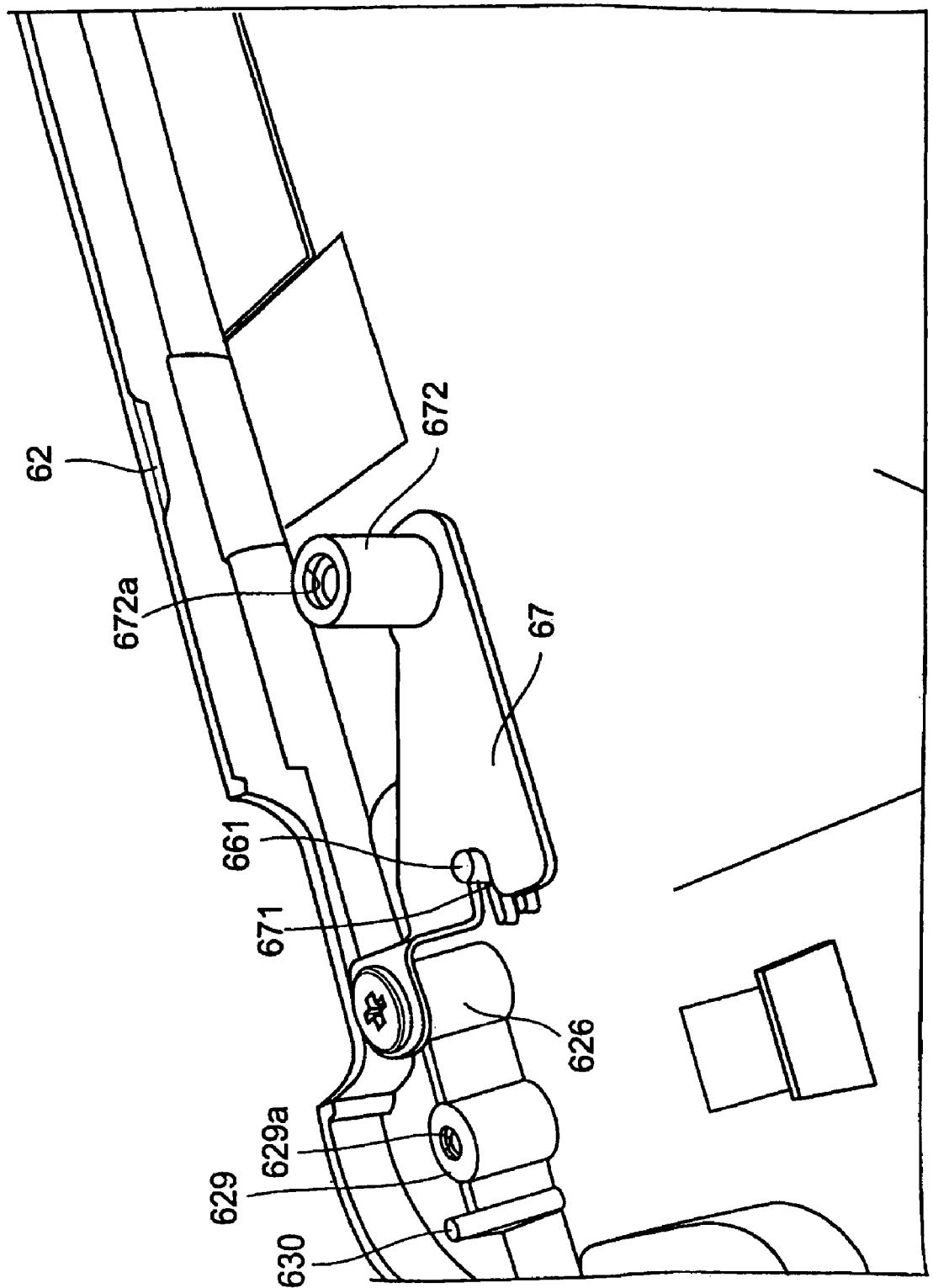
FIG. 24 another view which shows the structure of the lower left portion of the display panel.
Figure 25:
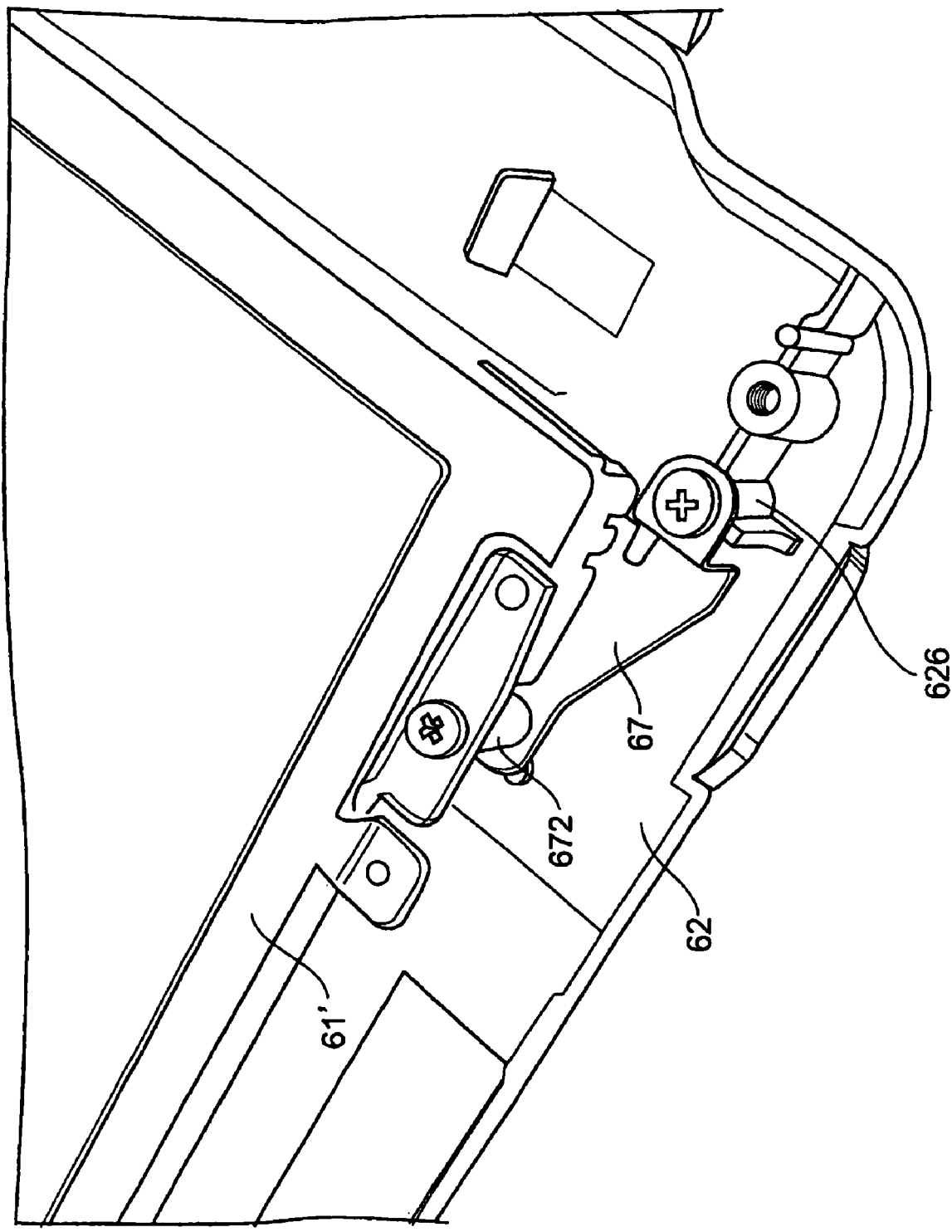
FIG. 25 another view which shows the structure of the lower left portion of the display panel.

FIGS. 22 to 25 show the fixed structure of the lower left portion of the display panel. FIG. 22 shows the back cover; FIG. 23 shows the display panel attached to the back cover; FIG. 24 shows another type of fixing part for fixing another type of display panel; and FIG. 25 shows another type display panel different from the display panel shown in FIG. 23, attached using the fixing part shown in FIG. 24. As shown in FIG. 23, back cover 62 comprises a boss 626 having a central screw hole for screwing a fixing part 66, and two positioning pins 627 and 628. Back cover 62 also comprises another boss 629 and projection 630 having a central screw hole 629a. They are used for attaching other parts, as described later, and are not related to mounting the display panel.

Positioning pin 627 is used to fix a display panel comprising a mounting hole positioned on the same central axis as the positioning pin 627. Positioning pin 628 is to fix a display panel in which a mounting hole is arranged on the same central axis as the positioning pin 628. Fixing part 66 shown in FIG. 22 has a mounting hole which has already accepted a screw and, therefore the mounting hole is hidden from view. The screw extends into the central screw hole (also obscured) of boss 626 on back cover 62. A positioning hole 661 is engaged with positioning pin 627. Part 66 comprises a screw hole 662 to which the mounting hole of the display panel is screwed. Fixing part 66 has a bent portion 66a comprising two plates bent to face each other, with positioning pin 627 formed on the lower plate, and screw hole 662 formed in the upper plate. Screw hole 662 is on the same axis as positioning hole 661. The diameter of the positioning hole 661 matches the diameter of the positioning pin 627, such that screw hole 662 can be positioned with high precision.

FIG. 23 shows display panel 61 with the mounting hole attached to screw hole 662 of fixing part 66. The mounting hole (obscured by a screw) of display panel 61, the screw hole 662, positioning hole 661, and positioning pin 627 are all on the same central axis, such that display panel 61 is positioned with high precision. As shown in FIGS. 22 and 23, another boss 629 and projection 630 are provided on back cover 62. The front cover 63 is screwed to the screw hole 629a of the boss 629 after alignment with projection 630.

Fixing part 67 shown in FIG. 24 is for mounting another type of display panel. As with fixing part 66 shown in FIG. 22, comprises a mounting hole (obscured by a screw) which is aligned with a central screw hole in boss 626. Fixing part 67 comprises a cutout 671 into which positioning hole 661 is engaged to position the fixing part. Fixing part 67 further comprises a boss 672 having a central screw hole 672a. The bottom of screw hole 672a is used as a positioning hole in which positioning pin 628 (see FIG. 22) is engaged. The upper portion of screw hole 672a is used for receiving a screw extending through a mounting hole of a display panel. FIG. 25 shows a display panel 61' which is screwed through a mounting hole to the screw hole of boss 672. The mounting hole of display panel 61', screw hole 672a of boss 672, and positioning pin 628 of back cover 62 are all on the same central axis, such that display panel 61' is fixed with high precision.

No boss is provided in the positions of positioning pins 627 and 628 of back cover 62 for the same reason as there is no boss in the position of the positioning pin 622 shown in FIG. 19. If a boss is set in the position of the positioning pin 627 shown in FIG. 22, it would interfere with the display panel 61' such that display panel 61' could not be incorporated. Likewise, if a boss is set in the position of the positioning pin 628 shown in FIG. 22, it would interfere with the mounting of display panel 61 shown in FIG. 23. In the exemplary embodiment, positioning pins 627 and 628 are provided on the same central axis as the mounting hole of the display panel, and either positioning pin 627 is engaged in positioning hole 661 of fixing part 66, as shown in FIG. 22, or positioning pin 628 is engaged at the bottom of screw hole 662a of boss 672 of fixing part 67, as shown in FIG. 24. Therefore, either of display panels 61 and 61' can be mounted with high position precision although a boss is set in a position different from the position of the mounting hole of the display panel.

Arrangement of External Coil

Figure 26:
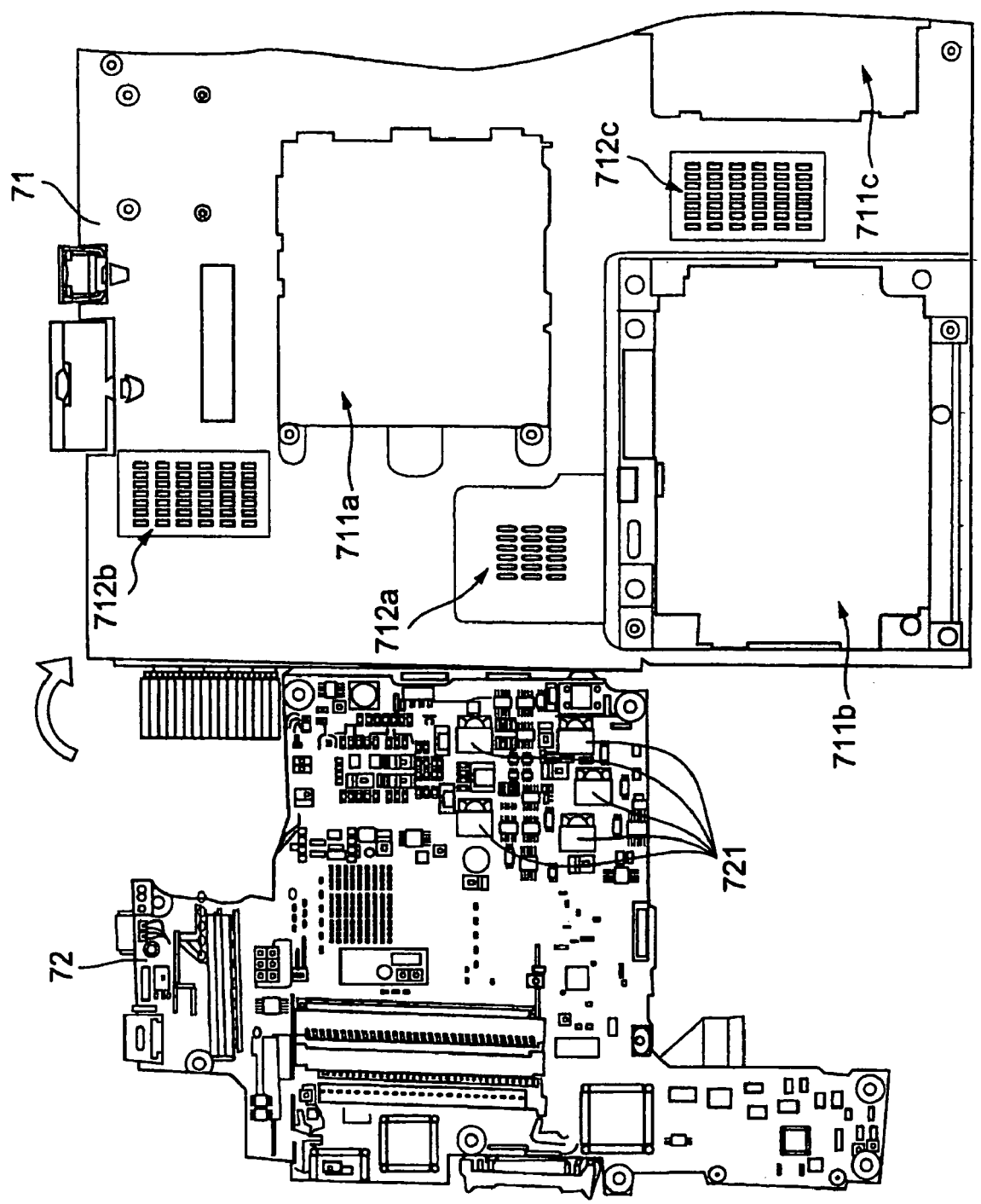
FIG. 26 shows a part of a bottom cover of an embodiment of the computer of the present invention, and a circuit substrate arranged on the bottom cover.

FIG. 26 shows part of a bottom cover 71 of the base unit 20 of computer 10 and a circuit substrate 72 arranged on the bottom cover. Base unit 20 of computer 10 comprises a bottom cover 71 shown in FIG. 26, circuit substrate 72 positioned on bottom cover 71, and upper cover 73 including the keyboard 21 (see FIG. 1). To promote clarity, other parts are not shown in FIG. 26. As shown in FIG. 26, the bottom cover 71 is provided with apertures 711a, 711b, and 711c and ventilation holes 711a, 711b, and 711c for circulation of air. Circuit substrate 72 comprises various circuits, for example four DC-DC converters are illustrated. FIG. 26 shows a total of five external coils 721 for four DC-DC converters together with many other circuit units. FIG. 26 further shows the inner side of the bottom cover 71, and the side of the bottom cover of the circuit substrate 72. Circuit substrate 72 is arranged on bottom cover 71 such that the face shown in FIG. 26 faces bottom cover 71 as indicated by arrow in FIG. 26.

Figure 27:
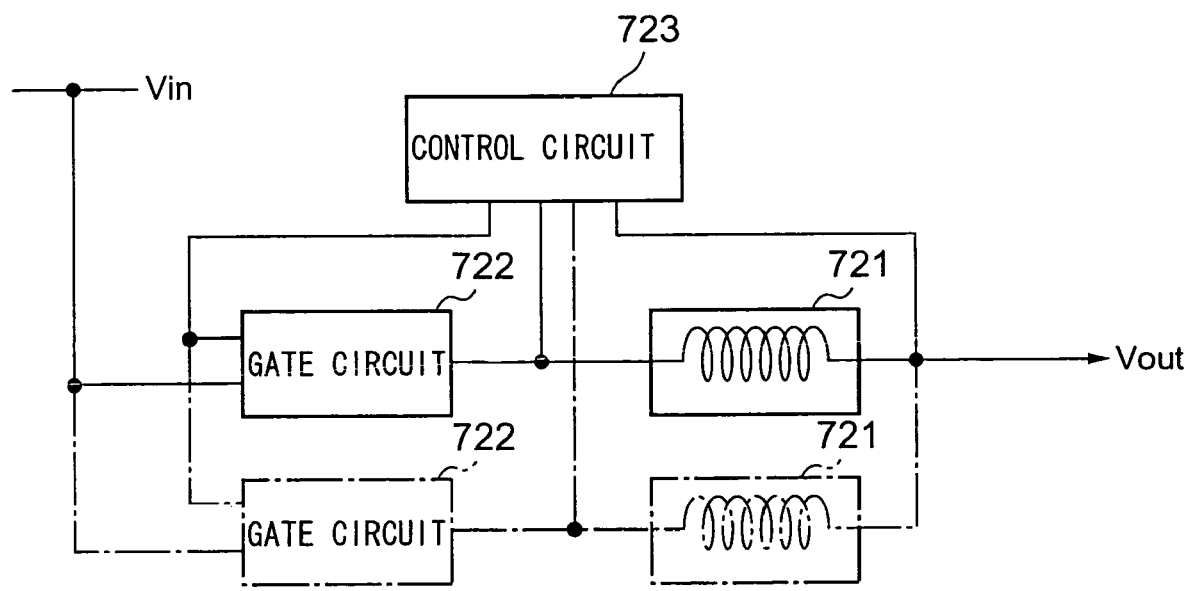
FIG. 27 is a block diagram of the DC-DC converter of the present invention.

FIG. 27 is a rough block diagram of a DC-DC converter. In one embodiment, a power supply of input voltage $V_{in}$, of 19V is applied when computer 10 is connected to an AC power supply, or a power supply voltage of 10.8V is applied when a battery (not shown in the attached drawings) is used. In either case, the power supply voltage is input to a gate circuit 722. Gate circuit 722 turns the input power on and off at the frequency of, for example, about 250 to 400 kHz under the control of a external coil 721, to generate predetermined DC voltage $V_{out}$. In the case of a DC-DC converter requiring large electric power, the gate circuit 722 and the external coils 721 are connected in parallel. The DC-DC converter itself is a well known technique, and no further explanation about the DC-DC converter is required.

As described above, when operating in the tablet PC mode, display panel 61 has a pen inputting function. In one embodiment the pen communicates with the display at a high frequency and is susceptible to interference from external rf. Specifically, rf in the range of 270 kHz to 300 kHz, the noise at the frequency around this level may cause interference. On the other hand, the DC-DC converter operates in this general frequency range, and the external coil 721 functions as an antenna to generate the noise at the frequency band.

When computer 10 is operated in the notebook PC mode, display screen 31 is separated from the circuit substrate in base unit 20, and any rf from the base unit is unlikely to interfere with the display screen. In the tablet mode 7, although the two units are in contact, the display is distal from the base unit, such that any rf from the circuit substrate in base unit 20 must penetrate the base unit to reach display screen 31. In this posture, rf noise from the circuit substrate is also not easily transmitted to display screen 31. However, in addition to the notebook PC mode and the tablet mode, a keyboard and a display monitor can be externally connected such that the computer may be used in the first closed status 5 with the display screen touching the base unit. When used in this manner, there is nothing to shield the rf from the circuit substrate from reaching the display screen 31.

In this example, as shown in FIG. 26, external coil 721 of the DC-DC converter is loaded on the side facing bottom cover 71 of circuit substrate 72. The external coil 721 generates strong noise on side loaded with external coil 721, but the noise transmitted to the reverse side of the surface loaded with the external coil 721 on the circuit substrate 72 is substantially attenuated. In this embodiment, the external coil 721 of the DC-DC converter is loaded on the surface facing the bottom cover 71 of the circuit substrate 72. Therefore, although computer is used in the first closed status, interference due to rf noise from the external coil 721 can be prevented.

In the illustrated embodiment, all five external coils 721 are loaded onto the bottom cover 71 of the circuit substrate 72. However, when the frequency used in a DC-DC is much different that the frequency used by display panel 61, such that potential interference is not a problem, it is not necessary to position the external coil of the DC-DC converter on the bottom cover of the circuit substrate 72.

Figure 28:
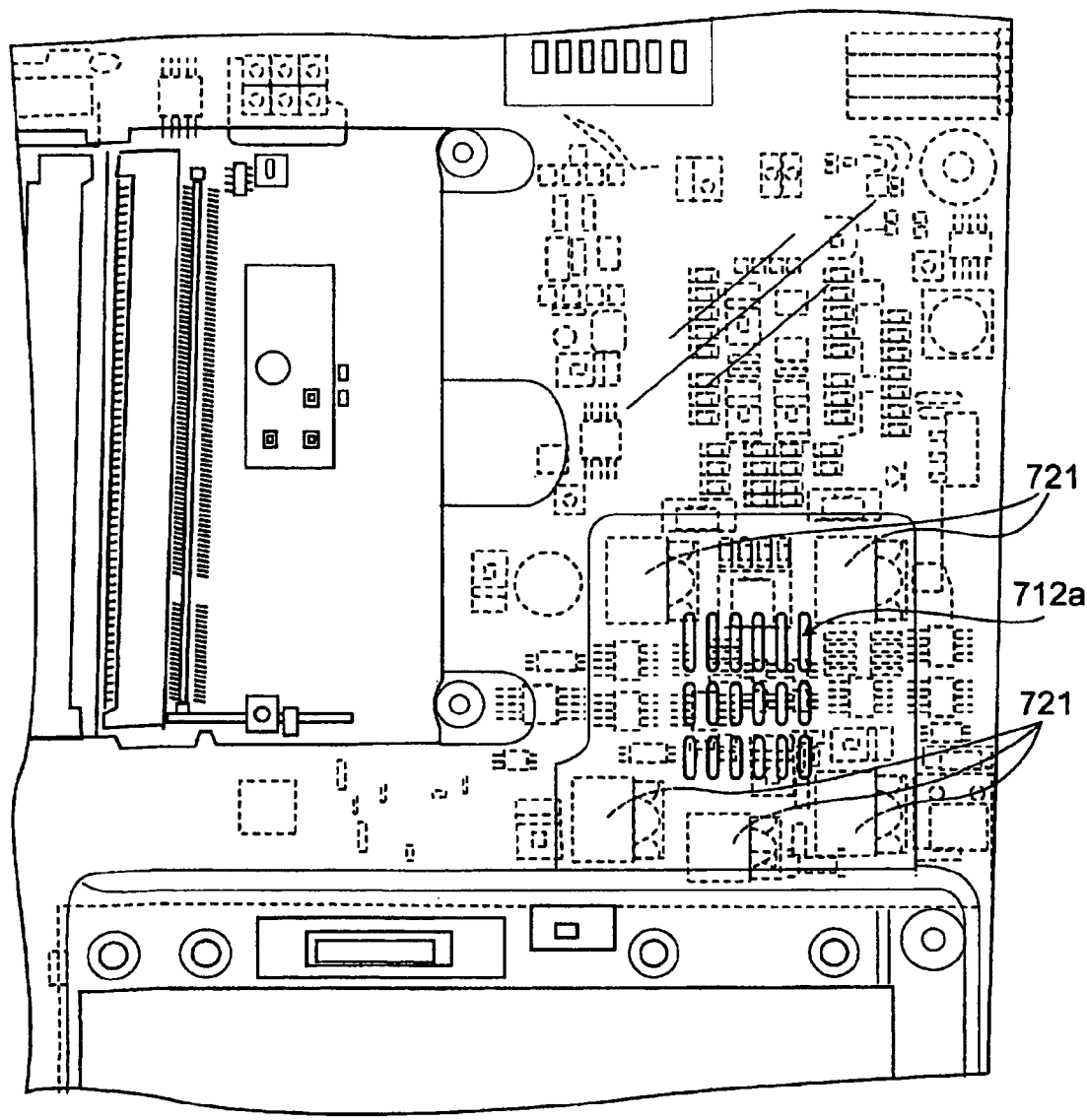
FIG. 28 shows the relative positions of the bottom cover and the external coil viewed from the bottom cover.

FIG. 28 shows the relative positions of the bottom cover and the external coils viewed from the bottom cover. The five external coils 721 on the circuit substrate 72 are arranged about the air hole 712a of bottom cover 71 because the coils of the DC-DC converters generate heat. When the heat generating external coil 721 is located immediately below (above) an air hole 712a, the flow of air is hindered and the heat dissipation is degraded. Therefore, the five external coils 721 are arranged in the positions surrounding the air hole 712a, not immediately below (above) the air hole 712a. Thus, the flow of air passing the air hole 712a can be correctly set and necessary cooling can be performed.

Protection of the Optical Disk

The specifications for typical optical disk drives normally require that such drives should only be used in specified orientations. Typically, the specifications require that a drive be used only in a horizontal or vertical orientation when drive media is being rotated. Failure to operate a drive in one of the specified orientations can prevent the drive from properly accessing information on the drive media or even cause damage to the drive or to the media in the drive. According to the present invention the drive motor is disabled when the tablet mode is entered to avoid this risk. Therefore, even if an optical disk is loaded, the potential for damage or malfunction can be avoided. In addition, when in the tablet mode, the computer is normally being carried and, therefore, is subject to movements due to handling by the user. This creates the risk that the eject button 262 will inadvertently be touched. However, according to the present invention, when the computer is in the tablet mode, the eject button is also disabled such that accidental opening the optical disk drive is prevented.

Figure 29:
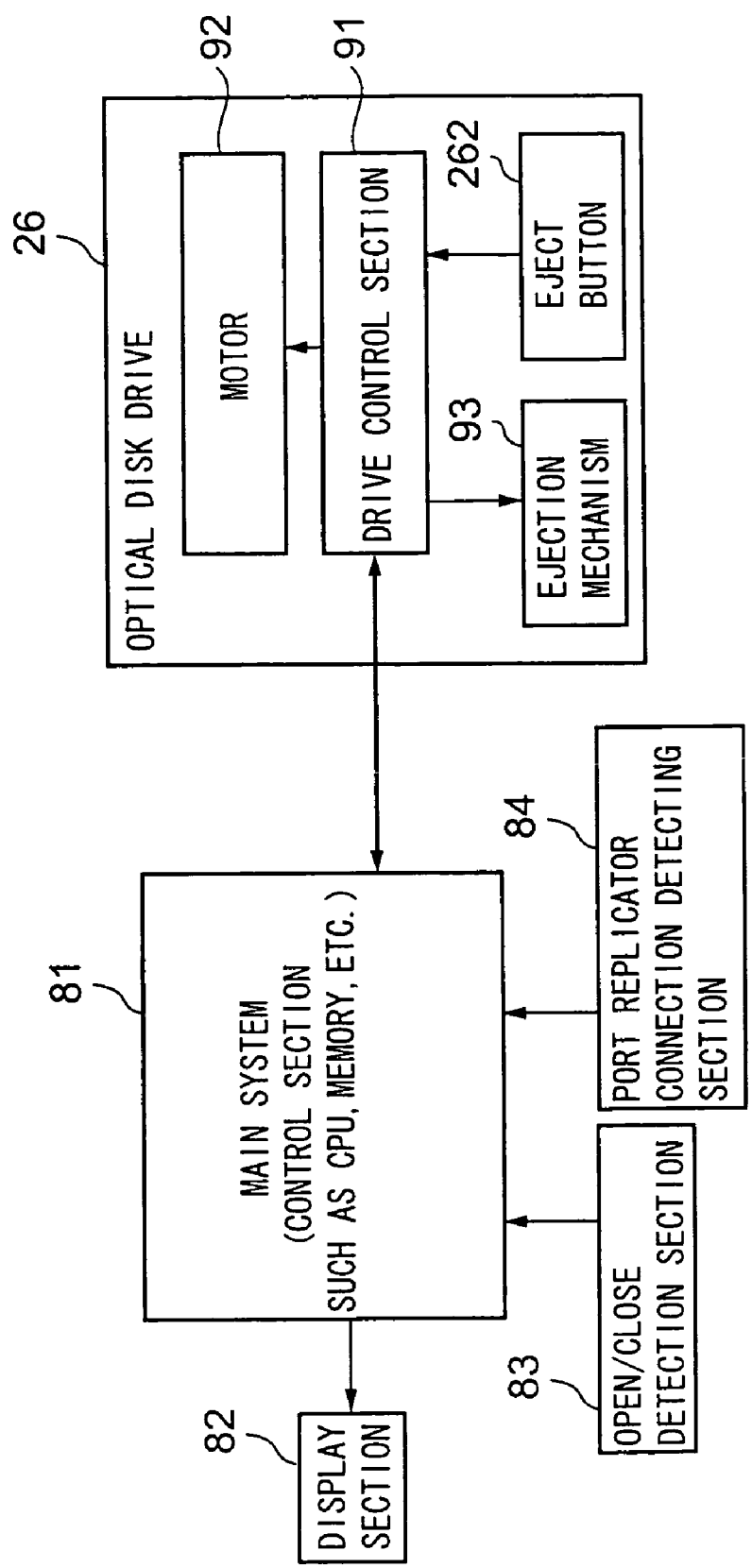
FIG. 29 is a block diagram for a circuit for controlling the optical disk drive of an embodiment of the convertible computer of the present invention.

FIG. 29 is a block diagram of one embodiment of a control system for the optical disk drive 26 of computer 10 in accordance with the present invention. FIG. 29 shows a motherboard control system 81 comprising the core of the computer. The computer depicted in FIG. 29 comprises motherboard control system 81 (comprising a CPU, memory, I/O chips, etc.) which provides control over the computer and any devices connected to it; a display section 82 for displaying an images on display screen 31 under control of motherboard control system 81; an open/close detection apparatus 83 for determining whether computer 10 is in the open status, the first closed status, or second closed status using magnetic sensors 271, 272, and magnets 341, 342 (refer to FIG. 16), and transmitting the detected information to motherboard control system 81; a port replicator connection detector 84 for detecting whether computer 10 is attached to port replicator 50 and transmitting the detected information to motherboard control system 81; and an optical disk drive 26 operating under the control of motherboard control system 81. Specifically, in a preferred embodiment, port replicator connection detector 84 detects whether connector 51 in port replicator 50 is connected to the computer using one pin of the connector.

As further shown in FIG. 29, optical disk drive 26 comprises a controller 91 connected to motherboard 81; a motor 92 for rotating an optical disk inserted in the drive under the command of controller 91; a drive tray control button 262 for opening and closing the drive tray; and a tray extension mechanism 93 for opening and closing the drive tray under the command of controller 91, either in response to activation of control button 262 or in response to a software command. Although the present invention is described in connection with an optical disk drive having a tray loading system, those skilled in the art will appreciate that it can be used with other types of drives comprising ejectable storage media, for example a floppy disk drive, an MO drive, etc.

Using open/close detection apparatus 83 and port replicator connection detector 84, motherboard control system 81 continuously monitors whether computer 10 is in the tablet mode. In a preferred embodiment, the computer is considered to be in the tablet mode, for purposes of the following discussion, whenever port replicator connection detector 84 detects that the computer has been disconnected from the port replicator 50, and open/close detection apparatus 83 detects that the computer is in the second closed status, as defined above. Conversely the computer is not considered to be in the tablet mode whenever the port replicator is connected or the computer is not in the second closed status. As described below, according to a preferred embodiment of the present invention, in order to provide to decrease the risk of damaging a drive or the media contained therein, control of the optical disk drive is varied according to whether the computer is in the tablet mode.

In the preferred embodiment, when motherboard control system 81 detects that the computer is in the tablet mode it transmits the information to drive control section 91 of optical disk drive 26. Upon receipt of the information drive control section 91 stops and prohibits further rotation of motor 92, and prohibits opening of the optical disk drive by ejection mechanism 93 even if eject button 262 is pressed. Conversely when drive control section 91 receives notification that the computer is not in the tablet mode from motherboard control system 81, it allows rotation of motor 92 and enables operation of the ejection mechanism 93 to open the optical disk drive. The control software used by motherboard control system 81 causes display section 82 to display whether access to an optical disk is prohibited, as described below.

Figure 30:
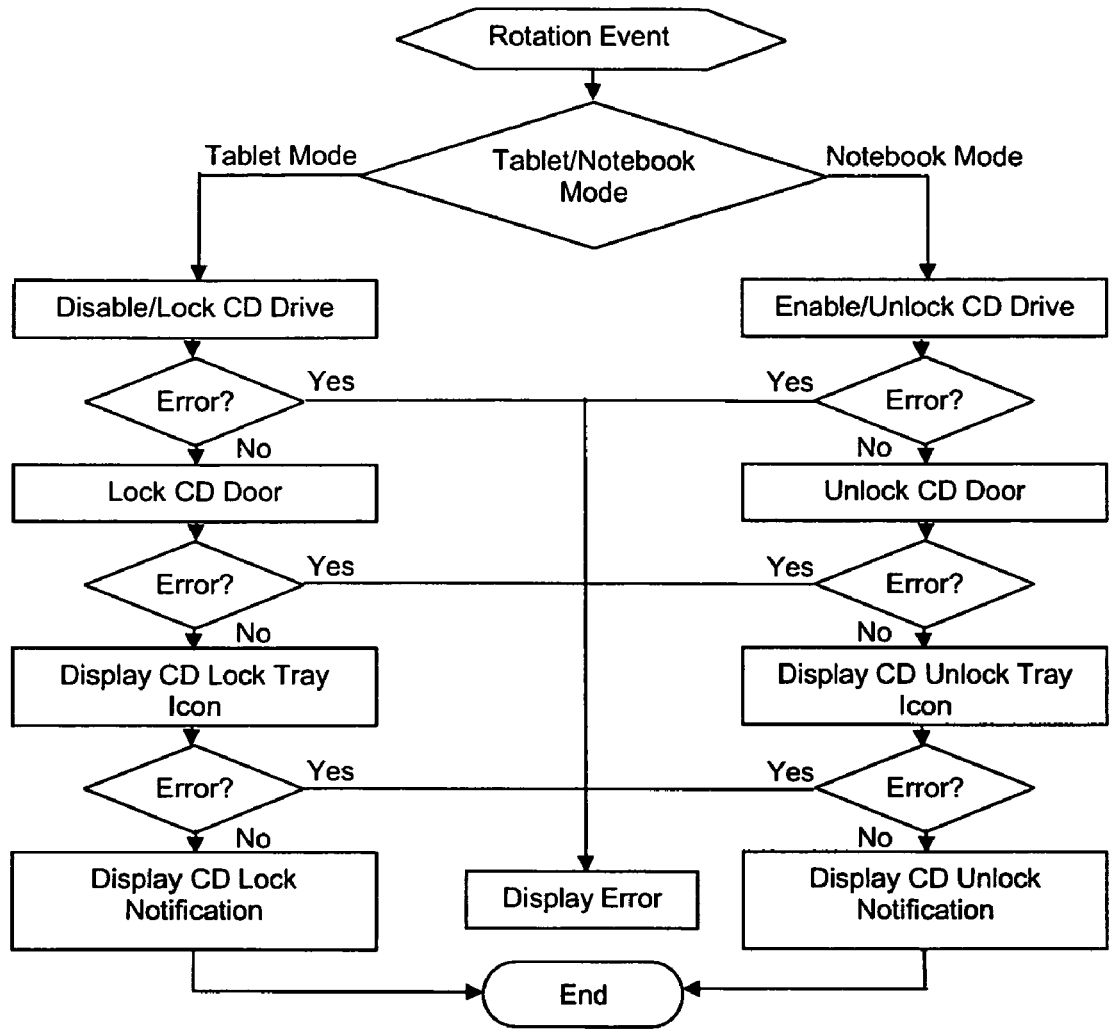
FIG. 30 is a flowchart of the program for locking and unlocking an optical disk drive in accordance with an embodiment of the present invention.

FIG. 30 is a flowchart of a monitoring program implemented by motherboard control system 81 for controlling access to the optical disk drive. Preferably, the program operates in the background whenever the computer is turned on, and continuously monitors open/close detection apparatus 83 and the port replicator connection detector 84 so that it can issue appropriate command whenever the computer enters or leaves the tablet mode. These events are generically identified in FIG. 30 as "rotation events." Specifically, the program first determines whether or not the computer is in the tablet mode. As described above, for purposes this discussion, the computer is not considered to be in the tablet mode if it is connected to the port replicator. If the computer is in the tablet mode, rotation of motor 92 and use of the disk tray are disabled, and status information alerting the user that the optical disk drive 26 is inoperable is displayed. Thereafter, when the computer is no longer in the tablet mode, use of the motor and drive tray are enabled, and any status notification is updated accordingly.

Figure 31:
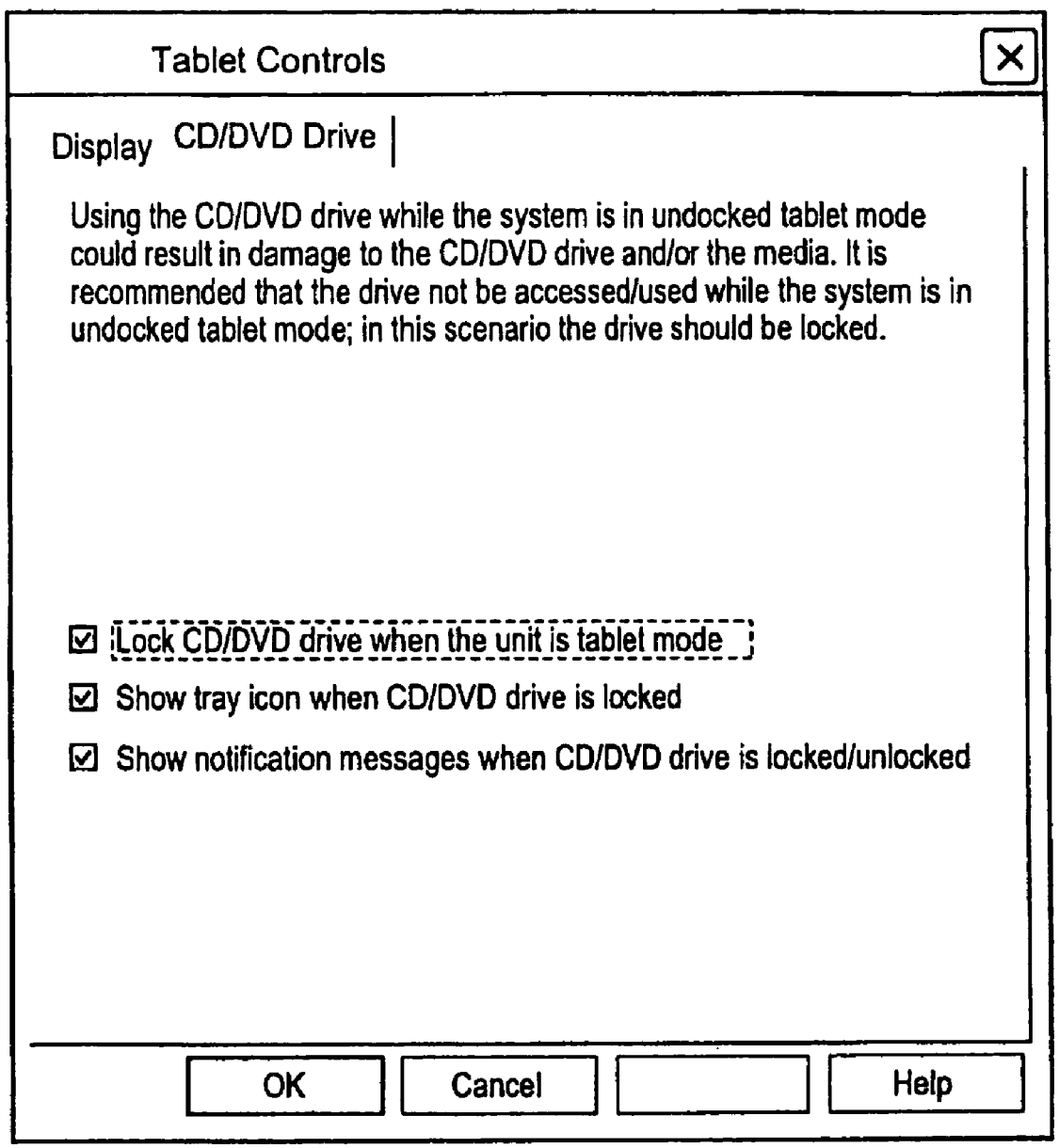
FIG. 31 is a screen display of a application program for enabling the user to control use of the optical disk drive.

In accordance with a preferred embodiment of the present invention, access to the optical disk drive when computer 10 is in the tablet PC mode is user controllable, with the default setting being to prohibit access, as described above. FIG. 31 shows a screen display presented to the user for controlling whether the function of prohibiting the use of the optical disk drive 26 in the tablet PC mode is implemented. The screen display may be presented to the user when the computer is first initialized, and is accessible, for example, in the "Control Panel" display in the WINDOWS® operating system. In this example, the function of prohibiting access to the drive, employing, for example, the program shown in FIG. 30, is implemented by checking the box "Lock CD/DVD drive when the unit is in tablet mode", and then pressing the "OK" button. As noted, in the preferred embodiment the box locking operation of the drive is checked by default. As further shown in FIG. 31, the dialog box displayed also provides the user with notification options concerning the status of the drive.

Figure 32:
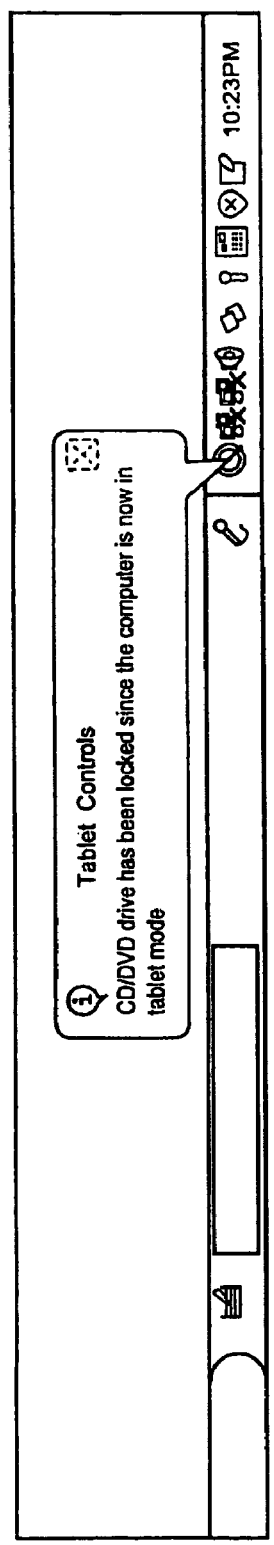
FIG. 32 is a screen display when the optical disk drive is disabled.
Figure 33:
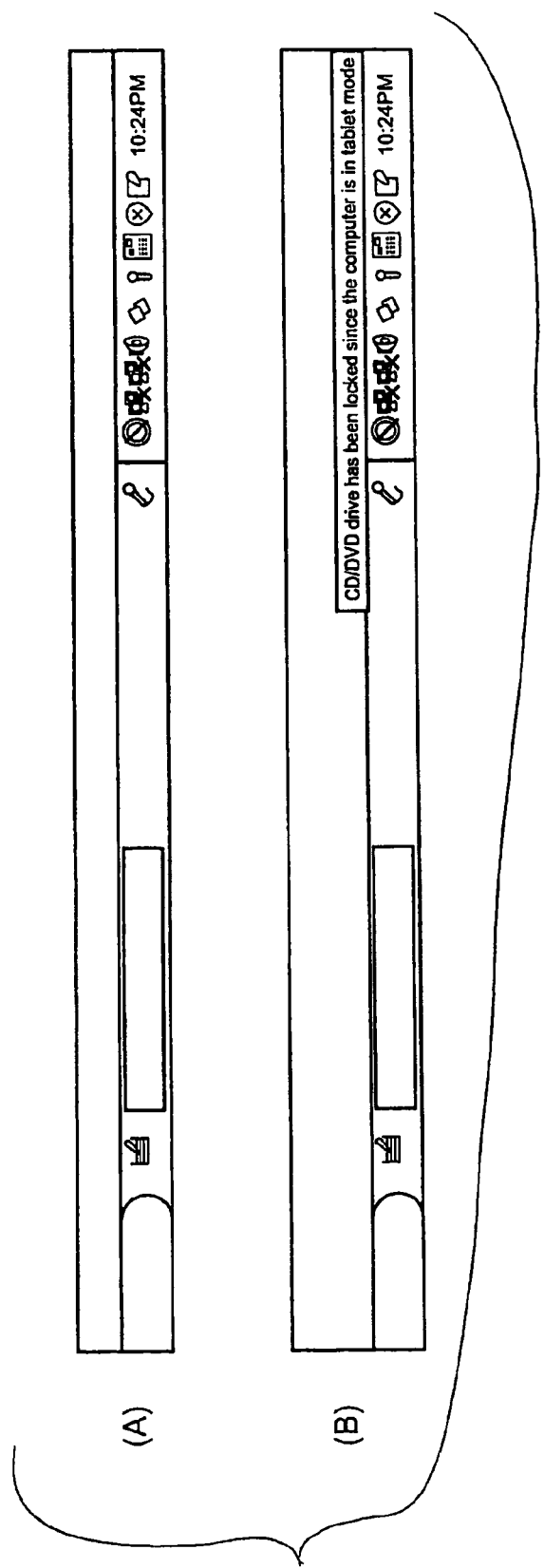
FIGS. 33A and 33B are further screen displays showing that the optical disk drive is disabled.

FIG. 32 shows a portion of the "desktop" screen display when the optical disk drive is disabled according to the present invention. An icon indicating that the optical disk drive is in the use disabled status is displayed in the system "tray", and a balloon notification indicating transition to the disabled status is displayed for a short period of time. FIG. 33A shows an example of the screen displaying that the optical disk drive is currently disabled after the balloon notification is no longer present, but showing the system tray icon indicating that the optical disk drive is disabled. When the display cursor is positioned over the icon, an explanation of the icon is displayed for a predetermined time as shown in FIG. 33B.

Figure 34:
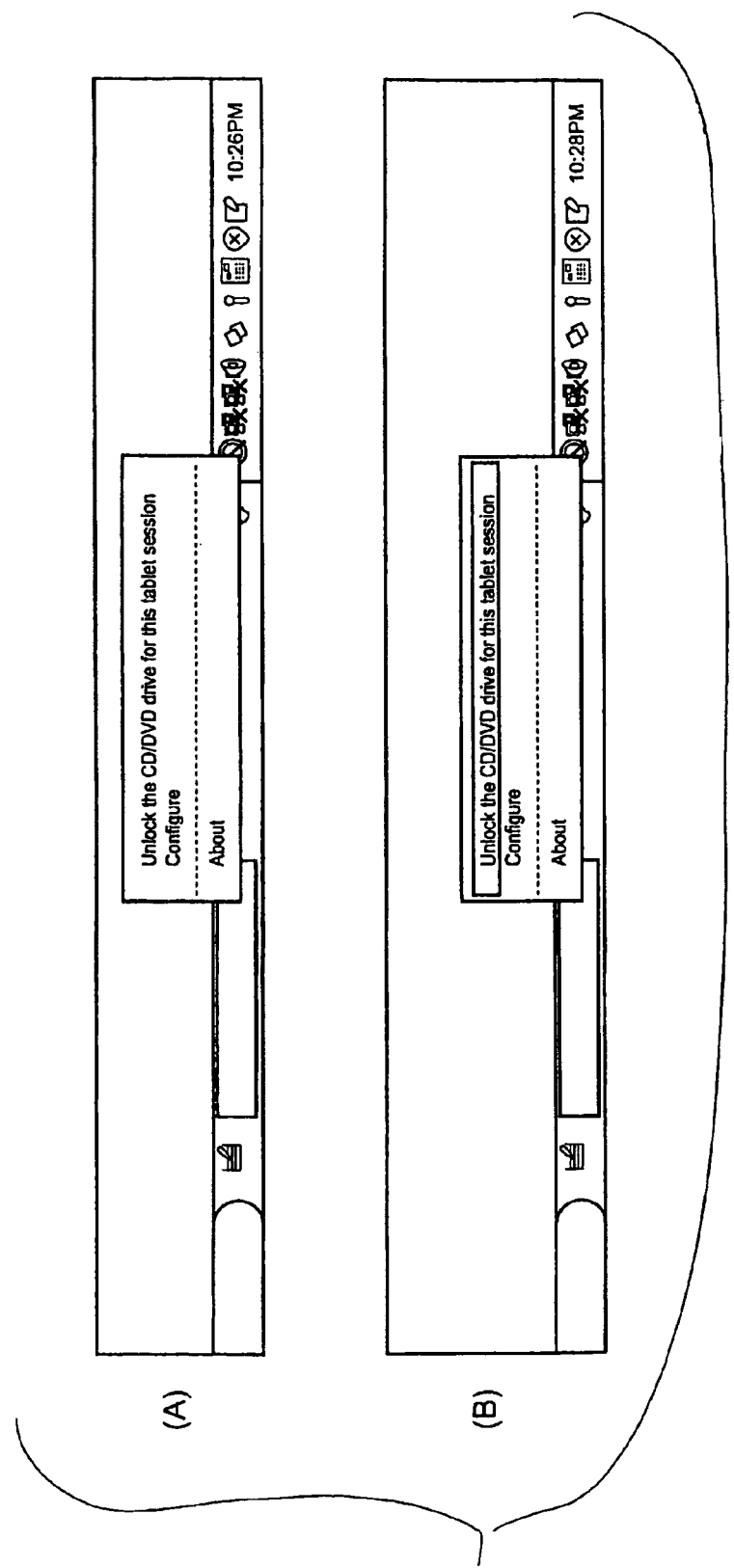
FIGS. 34A and 34B show examples of screen displays for enabling use of the optical disk drive.
Figure 35:
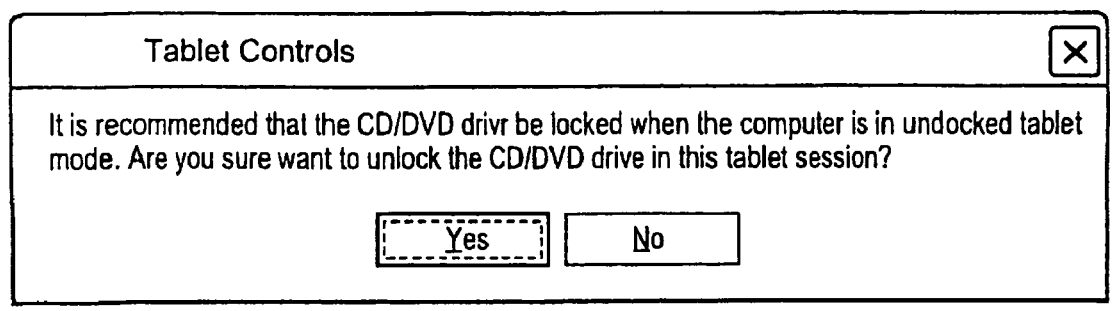
FIG. 35 shows an example of the screen displayed when use of the optical disk drive is enabled in response to the query displayed in FIG. 34B.
Figure 36:
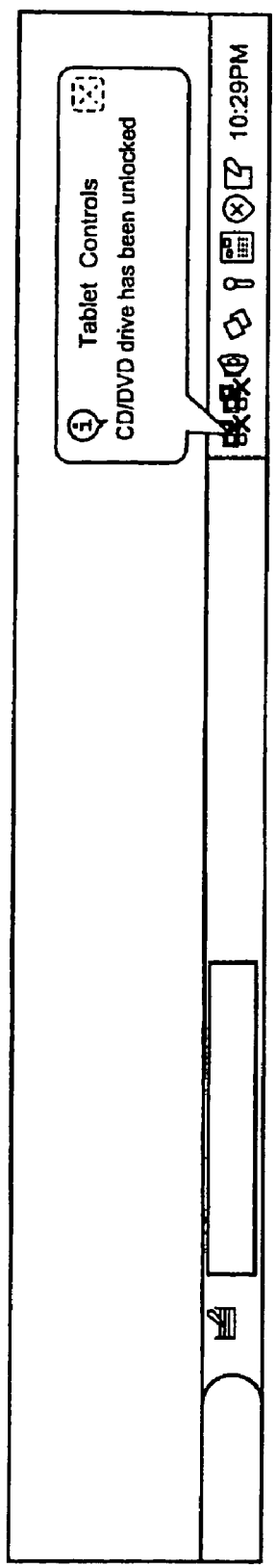
FIG. 36 shows an example of the screen displayed informing that the optical disk drive is enabled.

FIG. 34A shows the screen displayed when the optical disk drive disabled icon is clicked by the user. FIG. 34B shows the same screen when "Unlock the CD/DVD Drive for the tablet session" the dialog has been highlighted because it has been clicked by the user. Clicking "Unlock the CD/DVD Drive for the tablet session" allows the user to enable the optical disk drive 26 even in the tablet mode. FIG. 35 shows a warning dialog that appears when the "Unlock the CD/DVD Drive for the tablet session" is clicked. The screen is to confirm that the user wishes to access the optical disk drive 26. If "YES" is clicked on the screen, the optical disk drive 26 becomes available in the tablet mode, and the notice, as shown in FIG. 36 is displayed on the screen, for a predetermined period of time, informing the user that the optical disk drive 26 is no longer disabled.

Figure 37:
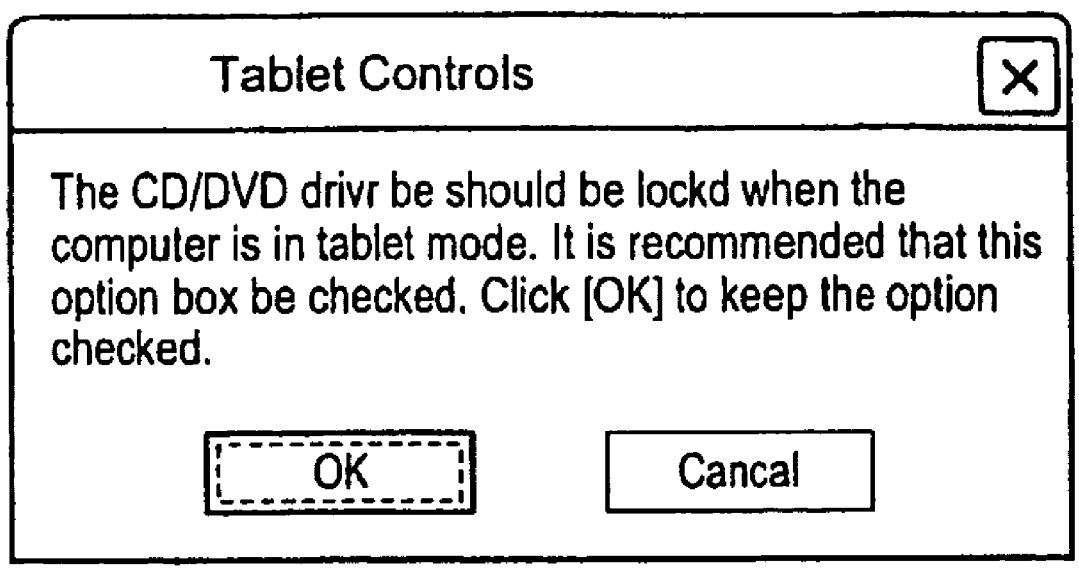
FIG. 37 shows the warning screen when the function of prohibiting the use of optical disk drive 26 is overridden in the tablet mode.

FIG. 37 shows a warning displayed on the screen when the user unchecks the "Lock the CD/DVD drive when the unit is in tablet mode", in the display of FIG. 31. The user must then click the "OK" button on the warning screen, as a verification, to allow use of the drive in the tablet mode.

As described above, the preferred embodiment of the present invention does not normally lock the optical disk drive when the computer is connected to a port replicator. However, in a further embodiment, the user control software has the capability of allowing the user to separately specify whether attaching a computer in the tablet mode to a port replicator automatically releases the locking mechanism. Specifically, in this embodiment, the control software allows the user to specify that connection to the port replicator should not enable use of the drive. Alternatively, the software can be set to query the user whether to release the drive when the computer in the tablet mode is connected to the port replicator, rather than doing so automatically. Finally, the control software preferably has the ability to lock the optical disk drive by implementing a software command issued by the user, regardless of the configuration of the computer. Thus, for example, the user may wish to lock the drive, even though the computer is in the notebook mode, when driving on a bumpy road, etc. Easy user control over the drive status, whether to enable access to a locked drive in the tablet mode, or to disable access to a drive in the notebook mode, for example, can be implemented by assigning a "hot key" (e.g., one of buttons 32 accessible in the tablet PC mode) or a function key (e.g., Fn+F11 on the keyboard) to launch the control program.

According to one embodiment, the control program of the present invention, which may be referred to as Drive Protection Software or "DPS," is written to work with the WINDOWS XP Tablet PC Edition operating system, and comprises three components: a "button driver" (hereinafter referred to as the "Fujitsu Button Driver" or "FBD"), a button support client or "BSC", and a CD lock application or "CLA". In the preferred embodiment, the FBD is a kernel mode driver that is treated by the operating system as a Human Input Device ("HID") mini-driver. In one embodiment, FBD is used not only for DPS, but also is used to control buttons 32 adjacent to display screen 31 of computer 10, which are accessible when the computer is in the tablet PC mode. FBD registers its resources, such as a button interrupt, with the operating system, and reports button collection to the HID driver that is, preferably, provided by the operating system. When a rotation event, as broadly defined above in connection with FIG. 30, is detected, a button interrupt is generated. The FBD processes this button interrupt in its interrupt service routine, and sends a button input report to the HID class driver. In the described embodiment, the FBD is used to report other button events, and decode logic is used to determine the button rotation event.

The BSC receives the button report from the FBD. With FBD as the HID mini-driver, the BSC is an HID kernel/user mode client. Under WINDOWS XP Tablet PC Edition, BSC is implemented by the operating systems. In other instances, (i.e., for other operating systems, such as WINDOWS XP Professional), the BSC is implemented by the computer maker. BSC, as an HID client, identifies and connects to the button collection reported by the FBD to the HID class driver. After connection, BSC waits for a button input to arrive. Upon receipt of a button report, the BSC determines the action to be taken depending on the event that is detected. In the case of a rotation event, the CLA component is launched or notified.

The CD Lock Application ("CLA") is responsible for disabling the optical disk drive if the computer is in the tablet mode and the disabling function has not been overridden by the user. The CLA can implement this functionality in a variety of different ways. One method of implementing the CLA is to exclusively locks the drive, such that no other application can access it. This is accomplished by notifying the operating system that the CLA has the exclusive right to access the disk drive, such that an attempt by any other application to access the drive will be denied by the operating system. This method does have limitations because certain applications, for example CD writing software, may bypass the operating system and access the drive in the raw mode. This type of CLA is relatively simply to write and implement.

In another implementation, the CLA acts as a filter driver that conditionally blocks access to the drive under the control of the BSC. The filter driver works as a layer over the optical disk drive device driver, and intercepts and processes any commands issued to the device driver, whether they come from the operating system or directly from a software application seeking to access the drive in the raw mode. Upon intercepting an attempt to access the drive, the filter driver, after determining that the unit is in the tablet mode and the drive access should be prohibited, informs the requesting program that drive access has been denied. A disadvantage of this approach is the need to ensure that the filter driver is compatible with a variety of optical disk drives, and their drivers.

Still another way to implement the CLA is cause it to simply disable the optical disk drive device driver when the disk drive is to be disabled. Thus, in this embodiment, the CLA may be written to unload disk driver from memory or to otherwise disable it when notified by the BSC. This is potentially the easiest solution to implement, however, in some circumstances may cause system instability, for example if the optical disk device driver needs to be enabled and disabled in rapid succession in situations where the user switches between the notebook and tablet mode repetitively in quick succession.

In accordance with a further aspect of the present invention, while the computer is "booting up," i.e., after it has been turned on and is under the control of the BIOS while the operating system is being loaded, the optical disk drive remains locked until the system verifies that it is safe to release it. Thus, prior to releasing the drive, the system first confirms that the convertible computer is not in the undocked tablet mode. Those skilled in the art will appreciate that the BIOS can be written to detect the status and, if appropriate, release the drive, or that the drive can simply be locked by the BIOS until the operating system loads and checks the computer status.

The drive control function of the present invention can also be applied to an apparatus in which a tray and a main function member can be moved to the storage status and the projection status for the computer as indicated by, for example, Japanese Patent Laid-open Publication No. 2001-69391, Japanese Patent Laid-open Publication No. 2001-92564, Japanese Patent Laid-open Publication No. 2001-125662, and Japanese Patent Laid-open Publication No. 2001-125680. By the control of the function of the electronic apparatus having the extended apparatus described above, a tray and a main function material can be prevented from popping out of the electronic apparatus from the extended apparatus during the operation in the tablet mode or during the transfer with the power supply kept on, thereby eliminating of obstacle to the operation and carriage.

Those skilled in the art will appreciate that the present invention can be applied not only to an apparatus with a two-axis hinge or other coupling mechanism, but also, for example, to an electronic apparatus having first unit and second unit with a coupling mechanism movable in one axis. When the first unit and the second unit is in the closed status during the power-on and the electronic apparatus is carried around, the problems above can be prevented and the effect of the present functions can be maintained.

What is claimed is:

1. An electronic apparatus, comprising:
   a first unit;
   a second unit coupled to the first unit through a coupling section which allows the second unit to be opened and closed relative to the first unit;
   a medium drive which accesses a removable storage medium; and
   an operation prohibition section which releases an operation prohibition mode for prohibiting at least one of an operation on the medium drive and drive of a storage medium by the medium drive when the second unit is in at least one of an open state and a first closed state, and sets the operation prohibition mode when the second unit is in a second closed state.

2. The electronic apparatus according to claim 1, wherein:
   the first unit can be attached to be removable from a third unit; and
   the operation prohibition section can set the operation prohibition mode when the second unit is in the second closed state as well as when the first unit is removed from the third unit, and release the operation prohibition mode when the second unit is not in the second closed state as well as when the first unit is attached to the third unit.

3. The electronic apparatus according to claim 1, wherein:
   the first unit can be attached to a third unit to be removable; and
   the operation prohibition section can set the operation prohibition mode when the first unit is removed from the third unit and release the operation prohibition mode when the first unit is attached to the third unit, regardless of the state of the second unit.

4. The electronic apparatus according to claim 1, further comprising:
   a display section which displays the notification that a medium drive cannot be used on the display screen when the operation prohibition section sets the operation prohibition mode.

5. The electronic apparatus according to claim 1, wherein the operation prohibition section accepts the release instructing operation indicating the release of the operation prohibition mode when the apparatus is in the operation prohibition mode, thereby releasing the operation prohibition mode.

6. The electronic apparatus according to claim 1, wherein the first unit has a keyboard, and the second unit has a display screen.

7. The electronic apparatus according to claim 1, wherein the coupling section is a two-axis coupling section which holds the first unit to be opened and closed, and to be rotated.

8. An electronic apparatus, comprising:
   a first unit;
   a second unit coupled to the first unit through a coupling section which holds the second unit to be opened and closed relative to the first unit;
   an expansion device having a unit which is provided in the first unit and moves to a storage status and an extended status relative to the first unit; and
   an operation prohibition section which releases an operation prohibition mode for prohibiting a movement of the unit of the expansion device from the storage status to the extended status when the second unit is in at least one of an open state and a first closed state, and sets the operation prohibition mode when the second unit is in a second closed state.

9. The electronic apparatus according to claim 8, wherein:
   the first unit can be attached to be removable from a third unit; and
   the operation prohibition section can set the operation prohibition mode when the second unit is in the second closed state as well as when the first unit is removed from the third unit, and release the operation prohibition mode when the second unit is not in the second closed state as well as when the first unit is attached to the third unit.

10. The electronic apparatus according to claim 8, wherein:
    the first unit can be attached to a third unit to be removable; and
    the operation prohibition section can set the operation prohibition mode when the first unit is removed from the third unit and release the operation prohibition mode when the first unit is attached to the third unit, regardless of the state of the second unit.

11. The electronic apparatus according to claim 8, wherein:
    the operation prohibition section accepts the release instructing operation indicating the release of the operation prohibition mode when the apparatus is in the operation prohibition mode, thereby releasing the operation prohibition mode.

12. The electronic apparatus according to claim 8, wherein:
    the first unit has a keyboard, and the second unit has a display screen.

13. The electronic apparatus according to claim 8, wherein:
    the coupling section is a two-axis coupling section which holds the first unit to be opened and closed, and to be rotated.

14. A method for operating an electronic apparatus the method comprising:
    detecting a status of a second unit relative to a first unit, the electronic apparatus comprising the first unit and the second unit being coupled to the first unit through a coupling section which holds the second unit to be opened and closed relative to the first unit, and the electronic apparatus further comprising a drive which accesses a removable storage medium; and
    releasing an operation prohibition mode for prohibiting an operation on the drive or access to the storage medium by the drive when the second unit is in at least one of an open state and a first closed state, and setting the operation prohibition mode when the second unit is in a second closed state.

15. A method of operating an electronic apparatus the method comprising:

detecting the status of a second unit relative to a first unit, the electronic apparatus comprising the first unit and the second unit coupled to the first unit through a coupling section which holds the second unit to be opened and closed relative to the first unit, and the electronic apparatus further comprising an expansion device having a unit which is provided in the first unit and moves between a storage status and an extended status relative to the first unit; and releasing an operation prohibition mode for prohibiting the movement of the unit of the expansion device from the storage status to the extended status when the second unit is in at least one of an open state and a first closed state, and setting the operation prohibition mode when the second unit is in a second closed state.

\* \* \* \* \*